US012560329B2

(12) United States Patent
Lieuwen et al.

(10) Patent No.: US 12,560,329 B2
(45) Date of Patent: Feb. 24, 2026

(54) NONPREMIXED, RICH, RELAX, LEAN COMBUSTOR

(71) Applicant: Georgia Tech Research Corporation, Atlanta, GA (US)

(72) Inventors: Timothy C. Lieuwen, Atlanta, GA (US); Benjamin L. Emerson, Atlanta, GA (US); Srujan Harish Gubbi, Atlanta, GA (US); Randal Mckinney, Atlanta, GA (US); Shivam Patel, Atlanta, GA (US); David Wu, Atlanta, GA (US); David Robert Noble, Catawba, NC (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 19/055,689

(22) Filed: Feb. 18, 2025

(65) Prior Publication Data

US 2025/0264220 A1 Aug. 21, 2025

Related U.S. Application Data

(60) Provisional application No. 63/556,239, filed on Feb. 21, 2024.

(51) Int. Cl.
*F23R 3/34* (2006.01)
*F23D 14/22* (2006.01)

(52) U.S. Cl.
CPC ........ *F23R 3/346* (2013.01); *F05D 2270/082* (2013.01); *F23D 14/22* (2013.01); *F23R 2900/03341* (2013.01)

(58) Field of Classification Search
CPC ............ F23R 3/346; F23R 2900/03341; F23D 2900/00008; F23D 14/20–24
See application file for complete search history.

(56) References Cited

U.S. PATENT DOCUMENTS

| | | | | |
|---|---|---|---|---|
| 4,427,362 A * | 1/1984 | Dykema | F23C 6/045 431/352 |
| 4,721,454 A * | 1/1988 | Schirmer | F23C 6/045 431/352 |
| 4,900,246 A * | 2/1990 | Schirmer | F23C 6/045 431/352 |
| 5,160,254 A * | 11/1992 | Bell | F23C 99/006 431/7 |
| 10,480,792 B2 * | 11/2019 | Slobodyanskiy | F02C 3/34 |

(Continued)

OTHER PUBLICATIONS

Aubrey Altshuller, Thermodynamic Considerations in the Interactions of Nitrogen Oxides and Oxy-Acids in the Atmosphere, 2012, Journal of the Air Pollution Control Association (Year: 2012).*

(Continued)

*Primary Examiner* — Stephanie Sebasco Cheng
(74) *Attorney, Agent, or Firm* — TROUTMAN PEPPER LOCKE LLP; Ryan A. Schneider; Dustin B. Weeks

(57) ABSTRACT

An exemplary embodiment of the present disclosure provides a combustor, comprising a non-premixed initial stage, a fuel mixing stage downstream of the initial stage, a relaxing stage downstream of the fuel mixing stage, an air mixing stage downstream of the relaxing stage, and a lean stage downstream of the air mixing stage.

15 Claims, 15 Drawing Sheets

(56) References Cited

U.S. PATENT DOCUMENTS

2017/0292708 A1* 10/2017 Terhaar .................. F23R 3/286

OTHER PUBLICATIONS

Richard Dennis and George Richards et al, 3.2 Combustion Strategies for Syngas and High-Hydrogen Fuel, 2007, sections 3.2-2 to 3.2-4 (Year: 2007).*

Wang and Yang, NOx Formation Mechanism and Emission Prediction in Turbulent Combustion: A Review, Jul. 12, 2024, p. 1 last para. and p. 2 para.1 (Year: 2024).*

Ortolani et al., Numerical and experimental analysis of the formation of nitrogen oxides in a non-premixed industrial gas burner, Jun. 13, 2024, p. 2 col. 1 para.3 (Year: 2024).*

Normann, Emission control of nitrogen oxides in the oxy-fuel process, May 21, 2009, Progress in Energy and Combustion Science 35 (2009) 385-397 (Year: 2009).*

* cited by examiner

NONPREMIXED, RICH, RELAX, LEAN COMBUSTOR

CROSS-REFERENCE TO RELATED APPLICATIONS

This application claims the benefit of priority to U.S. Provisional Patent Application No. 63/556,239 filed Feb. 21, 2024, the content of which is incorporated by reference herein in its entirety.

GOVERNMENT LICENSE RIGHTS

This invention was made with government support under 80NSSC21M0068, awarded by NASA University Leadership Initiative. The government has certain rights in the invention.

FIELD OF THE DISCLOSURE

The various embodiments of the present disclosure relate generally to combustors.

BACKGROUND

Nomenclature used herein: LPM=Lean Pre-Mixed; NRRL=Non-premixed, Rich, Relaxation, Lean; OEM=Original Equipment Manufacturer; RQL=Rich-Quench-Lean; Φ=Equivalence Ratio; and τ=Residence Time.

Modern combustion systems almost exclusively utilize lean, premixed designs to meet NOx emissions regulations. While some systems also utilize non-premixed combustors with water injection, water availability, environmental impacts on water sources, and operation of a complex water chemistry skid have made them less popular. In either case, a key design intent is to minimize NO formation rates between atmospheric $N_2$ and $O_2$, which can be achieved by keeping flame temperatures well below stoichiometric values. This is essentially a "kinetic" strategy as equilibrium NO values at combustion temperatures are of O (1000) ppm (see FIG. 1).

Given this strategy, premixed combustion design from 1990 to ~2010 essentially focused on three key interacting challenges. The first is mixedness, essentially developing spatially compact, low pressure drop hardware to achieve spatially and temporally uniform mixtures, thereby eliminating locally elevated stoichiometry pockets that cause elevated NOx emissions. The second is operability, particularly managing combustor limits due to flame blowoff, flashback, autoignition, and combustion instability. The third is turndown, which involves having systems that can operate over a range of power levels, while still maintaining acceptable operability and emissions. Addressing these has resulted in more complex fuel staging schemes, which are used to manage combustion instabilities and part-load emissions. Fuel flexibility has also been an issue, as gas turbine OEMs have looked at various "opportunity" fuels, including synthesis gas ($H_2$/CO blends), gases with various diluent levels (e.g., $CO_2$ or H2O), and higher hydrocarbons (e.g., $C_2H_6$, $C_3H_8$, etc.). More recently, interest in high $H_2$ blends and ammonia have been added to this list.

The nature of all these challenges has continued to evolve as improvements in cooling strategies, materials, and coatings have enabled steady increases in turbine inlet temperature, which has increased NOx formation rates at full power and combustor cooling air budgets, and modified combustor acoustic damping strategies. Indeed, the basic lean, premixed design approach, which allowed acceptable NOx, worked for allowable turbine inlet temperatures of about 1800 K, but required additional axial fuel staging as turbine heat transfer improved to the point where higher flame temperatures were necessary. These axial fuel staging concepts essentially burn the majority of the fuel in a conventional lean, premixed manner, and then inject the remaining fuel near the turbine inlet where the high temperatures lead to rapid heat release while the short residence time minimizes NO formation.

As alluded to above, the lean premixed approach is increasingly strained by competing demands, demands that are becoming increasingly problematic in a decarbonizing energy sector. A few examples are given below.

First, the kinetic nature of the NOx control strategy can require both low temperature/low residence times to ensure NO stays well below its equilibrium levels. These low residence times can introduce significant turndown challenges, as the lower temperatures occurring at low power levels can slow down CO relaxation rates leading to excessive CO levels.

Second, premixing fuel and air can inherently lead to challenges of flashback and/or autoignition—these issues can be particularly problematic with hydrogen and higher hydrocarbon fuels, respectively. While hydrogen in and of itself is not necessarily problematic, it can be challenging to develop premixed systems that can operate without flashback or blowoff across the full range of 0-100% H2 and natural gas.

Third, combustion instabilities can be an inherent challenge with all high-performance combustion systems and are a major research and technology development challenge for lean, premixed designs. Lean premixed designs, by their very nature, can have lower acoustic damping levels than diffusion flame combustors. While it may not be difficult to design systems that are stable at a given operating point for a given fuel, it can be much more challenging to design them to stably operate over a broad range of power settings and fuel compositions. Today, these challenges can be addressed with multiple fuel circuits, which can increase cost and complexity relative to nonpremixed systems.

Finally, lean premixed and water injection strategies may not work at all for ammonia-fired systems, where fuel-bound nitrogen atoms can react quickly with oxygen, leading to O (1000) ppm NO.

None of the above challenges are completely new, and the combustion community has made steady progress in addressing them. However, gas turbines can also operate in an evolving technology mix and regulatory environment. Operational flexibility for gas turbines will become increasingly important, as their role evolves from a primary provider of energy to the grid, to a provider of capacity and resilience, and they must compete for these services with a host of new technologies, including energy storage and fuel cells. In this environment, it can be critical to have systems that can operate acceptably and with low emissions over an extended power range, with a broad range of fuel options.

Accordingly, there is a need for improved combustion strategies that address one or more of the drawbacks discussed above.

BRIEF SUMMARY

An exemplary embodiment of the present disclosure provides a combustor, comprising a non-premixed initial stage, a fuel mixing stage, a relaxing stage, an air mixing stage, and a lean stage.

In any of the embodiments disclosed herein, the fuel mixing stage can be downstream of the initial stage, the relaxing stage can be downstream of the fuel mixing stage, the air mixing stage can be downstream of the relaxing stage, and the lean stage can be downstream of the air mixing stage.

In any of the embodiments disclosed herein, the initial stage can be configured to receive fuel from a non-premixed fuel source, e.g., from a fuel tank system with a fuel pump, and to receive air from a non-premixed air source, e.g., from a gas turbine engine compressor.

In any of the embodiments disclosed herein, the non-premixed fuel source can be operatively connected to receive a flow from the non-premixed initial stage that comprise non-premixed combustion products and excess fuel.

In any of the embodiments disclosed herein, the fuel mixing stage can be configured to mix fuel from the non-premixed fuel source and the non-premixed combustion products and excess fuel to generate a flow of a rich front end products.

In any of the embodiments disclosed herein, the relaxing stage can comprise a plurality of relaxation zones.

In any of the embodiments disclosed herein, the relaxing stage can be operatively connected to receive the flow of rich front end products.

In any of the embodiments disclosed herein, the relaxing stage can be configured to relax $NO_X$ formed in the non-premixed initial stage to its equilibrium state.

In any of the embodiments disclosed herein, the relaxing stage can be configured to relax HCN formed in the non-premixed initial stage to its equilibrium state.

In any of the embodiments disclosed herein, the relaxing stage can be configured to generate rich stage products.

In any of the embodiments disclosed herein, the air mixing stage can be configured to mix the rich stage products with staged air, e.g., from the non-premixed air source, to generate air-mixed rich products.

In any of the embodiments disclosed herein, the lean stage can be configured to oxidize the air-mixed rich products into oxidized air-mixed products.

In any of the embodiments disclosed herein, the lean stage can be configured to increase a temperature of the oxidized air-mixed products to an exit temperature.

Another exemplary embodiment of the present disclosure provides a combustor system. The combustor system includes a non-premixed stage conduit with one or more inlets operatively connected to receive fuel from a source of non-premixed fuel and to receive air from a non-premixed source of air. The non-premixed stage conduit has an outlet configured to issue a flow of initial stage products. A fuel mixing conduit includes one or more inlets operatively connected to receive the initial stage products from the non-premixed stage conduit and staged fuel from the source of non-premixed fuel. The fuel mixing conduit has an outlet configured to issue a flow of rich front end products. A relaxing conduit has an inlet operatively connected to receive the flow of rich front end products. The relaxing conduit is configured to provide residence time to convert the flow of rich front end products into rich stage products. The relaxing conduit has an outlet configured to issue the rich stage products. An air mixing conduit has one or more inlets operatively connected to receive the rich stage products and to receive staged air, e.g., from the non-premixed source of air. The air mixing conduit is configured to provide residence time to convert the rich stage products into air-mixed rich products, the air mixing conduit having an outlet configured to issue a flow of the air-mixed rich products. The air-mixed rich products can be at a globally fuel-lean composition.

In any of the embodiments disclosed herein, a lean stage conduit can be included with an inlet operatively connected to receive the flow of the air-mixed rich products. The lean stage conduit can be configured to provide residence time to oxidize the flow of the air-mixed rich products into oxidized air-mixed products. The lean stage conduit can have an outlet configured to issue the oxidized air-mixed products, e.g. to a downstream turbine.

Another exemplary embodiment of the present disclosure provides a method of combustion for gas turbine engines. The method includes relaxing NOx formed in a flow of rich front end products into an equilibrium state of the NOx to generate rich stage products.

In any of the embodiments disclosed herein, the method can include generating the flow of rich front end products from a mixture of: fuel from a non-premixed fuel source and a flow of non-premixed combustion products and excess fuel.

In any of the embodiments disclosed herein, the method can include generating the flow of non-premixed combustion products and excess fuel from a mixture of: fuel from the non-premixed fuel source and air from a non-premixed air source.

In any of the embodiments disclosed herein, the method can include mixing the rich stage products with staged air from a non-premixed air source to generate air-mixed rich products.

In any of the embodiments disclosed herein, the method can include oxidizing the air-mixed rich products into oxidized air-mixed products.

In any of the embodiments disclosed herein, oxidizing the air-mixed rich products can include increasing temperature of the air-mixed rich products to issue a flow of the oxidized air-mixed products at a temperature higher than that of the air-mixed rich products prior to oxidizing and/or lower than that of the rich products before air mixing.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As explained below, some embodiments of the present disclosure provide novel nonpremixed-rich-relaxation-lean (NRRL) staged combustion strategies. Reverting to nonpremixed designs can enable enormous simplifications and flexibility-eliminating/reducing flashback and flammability limit considerations and likely reducing combustion instability risks.

NOx Equilibrium and Kinetic Considerations

Figure 1:
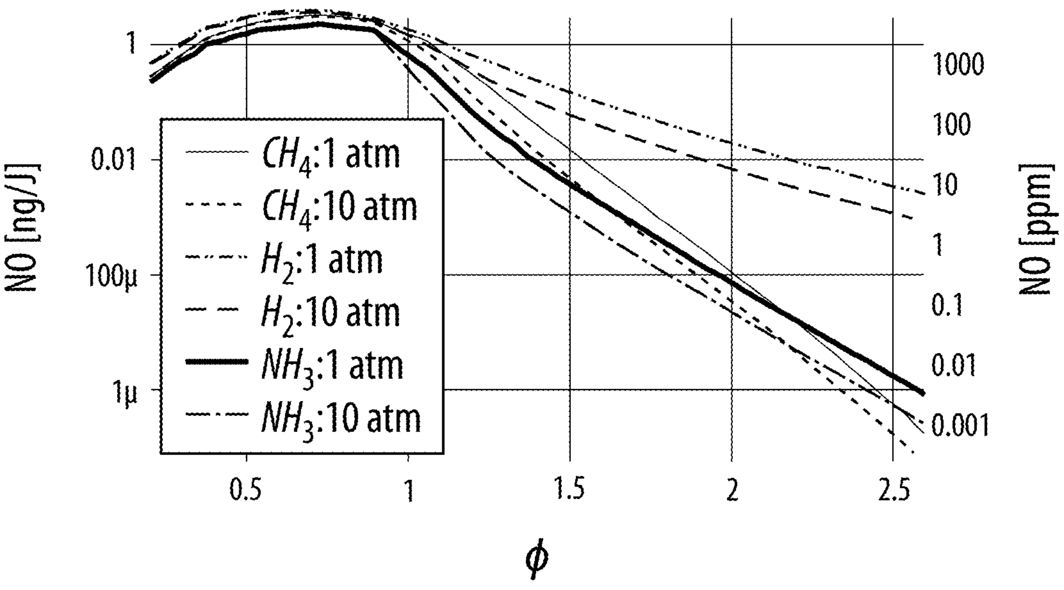
FIG. 1 is a graph showing equilibrium NO (ng/J) for various fuels with reactant temperature of 650 K and 1 atm (solid) and 10 atm (dashed), wherein the NO concentration (ppm) scale at right is valid for $CH_4$, 10 atm only.

To motivate some of the concepts disclosed below, it is helpful to consider equilibrium and kinetic considerations for NO. FIG. 1 plots equilibrium NO levels for methane, hydrogen, and ammonia as a function of equivalence ratio. The figure shows that lean equilibrium levels for all three fuels are very high, O(1000) ppm—values that are two orders of magnitude above NOx regulations in many developed economies. Since any air-breathing system will operate globally lean, this plot immediately implies that NO formation rates may need to be managed, or that NOx may need to be cleaned up after combustion.

Figure 2:
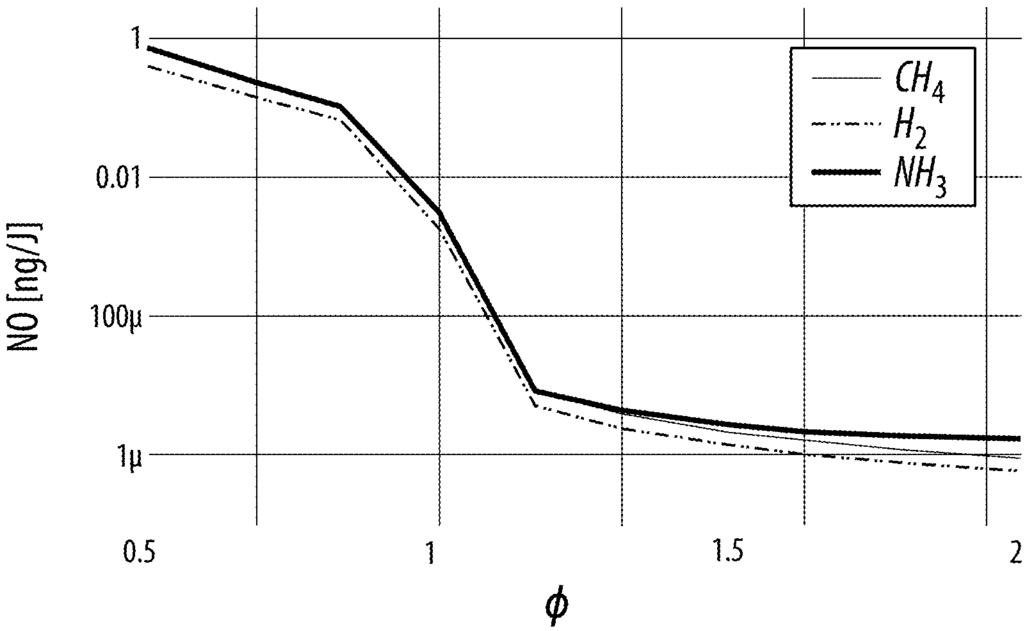
FIG. 2 is a graph showing various mixtures of various fuels and artificial air ($N_2$, $O_2$, Ar) fixed to $T_{ad}$=1600 K and 10 atm.

Note that the figure suggests additional fuel composition effects, i.e., $H_2$ and $NH_3$ have the highest and lowest NO at a given equivalence ratio, respectively. However, this is due to a thermal effect as these different fuels all have different adiabatic flame temperatures at a given equivalence ratio. FIG. 2 presents calculations that show that all the fuels have essentially the same lean and rich equilibrium values when compared at the same temperature. This figure was generated from calculations where argon was used to dilute various compositions (f) to the same adiabatic flame temperature.

Figure 3:
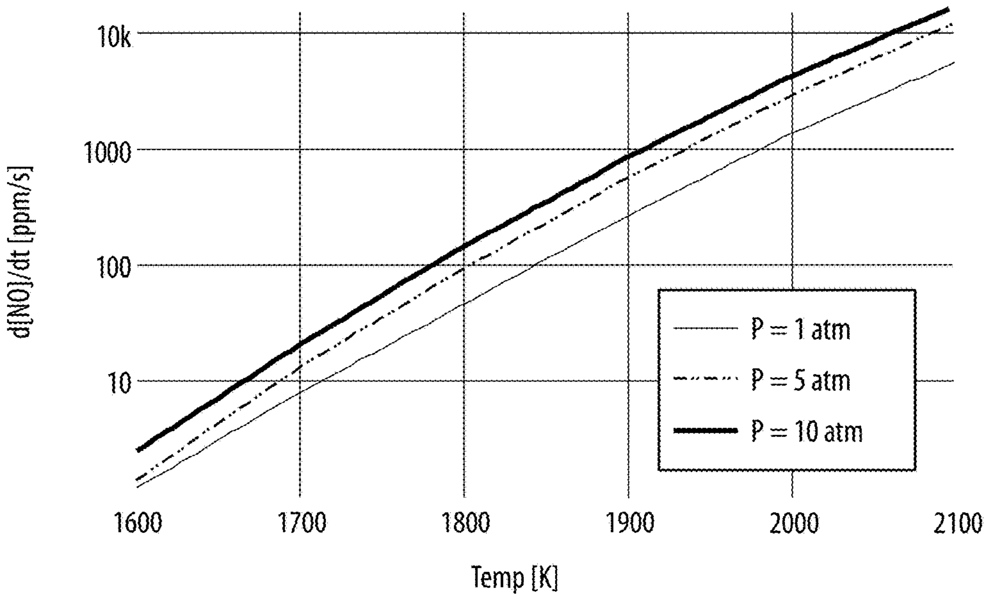
FIG. 3 is a graph showing average post-flame NO formation rates for $CH_4$/air mixtures starting at 650 K.

Having considered equilibrium tendencies, consider next kinetic rates. FIG. 3 plots post-flame NO formation rates for 1-D, premixed $CH_4$/Air flames at various lean conditions. The total NO produced will then equal NO produced in the flame, plus the product of the combustor residence time and this plotted formation rate. This formation rate plot illustrates that the only possible strategies to minimize NO formation in a single stage, globally lean combustor are operating at lower temperatures and/or low residence times.

This is the essence of the lean, premixed approach used today. This NOx management strategy gets more difficult at higher pressures and higher temperatures, due to faster kinetic rates.

For multi-stage combustors, air staging is a second strategy. This approach uses a rich stage first and, crucially, provides sufficient residence time for the stage to reach equilibrium. As shown in FIG. 1, rich equilibrium values can be O(1) ppm. In addition, these rich equilibrium levels decrease with pressure for all fuels. In other words, to achieve these low NO equilibrium levels in this rich section, one may want (1) long residence times and/or (2) fast reaction rates, generally achieved at higher pressures and temperatures.

However, rich, premixed front ends are not always substantially better than lean, premixed systems, due to the need for premixing, and the inherent operability issues of flashback and flammability limits. As such, some of the systems disclosed herein can include an initial non-premixed combustor stage. Since the front end of the combustor can be globally rich, this implies that only a fraction of the fuel entering the head end reacts with air. Being a nonpremixed flame, this fractional fuel can burn in a stoichiometric flame, where both NOx formation rates and equilibrium levels are high. However, if the first stage is operated globally rich, FIG. 1 also shows that these nonpremixed combustion products, if given sufficient time, can mix and react with fuel and "relax" down to low equilibrium levels.

As such, some embodiments of the present disclosure can provide combustors with one or more of the following features: a nonpremixed initial stage, where some fraction of heat is released, and fuel is decomposed; mixing of nonpremixed combustion products with excess fuel, forming the rich front end; multiple simultaneous relaxation zones where NO formed in the nonpremixed initial stage relaxes to its rich equilibrium value and/or HCN similarly relaxes (this relaxation can ensure minimal NO production in the lean stage and will be discussed later); mixing of rich stage products with staged air; and a lean, partially premixed stage to oxidize rich products and reach exit temperature.

Note that this relaxation process mentioned above can be a fundamentally different one than that illustrated in FIG. 3 which shows post-flame NO formation rates associated with $N_2$ and $O_2$ reactions. Rather, this rate can be associated with the relaxation of elevated NO levels towards equilibrium when the local stoichiometry is changed.

The disclosure below considers two key issues—first, it aims to quantify the relaxation processes described above which can be associated with mixing of stoichiometric combustion products with additional fuel. Secondly, fundamental minimum NO levels of such a concept are determined and compared to a combustor operating with a single lean, premixed stage.

Modeling Approach

Figure 4:
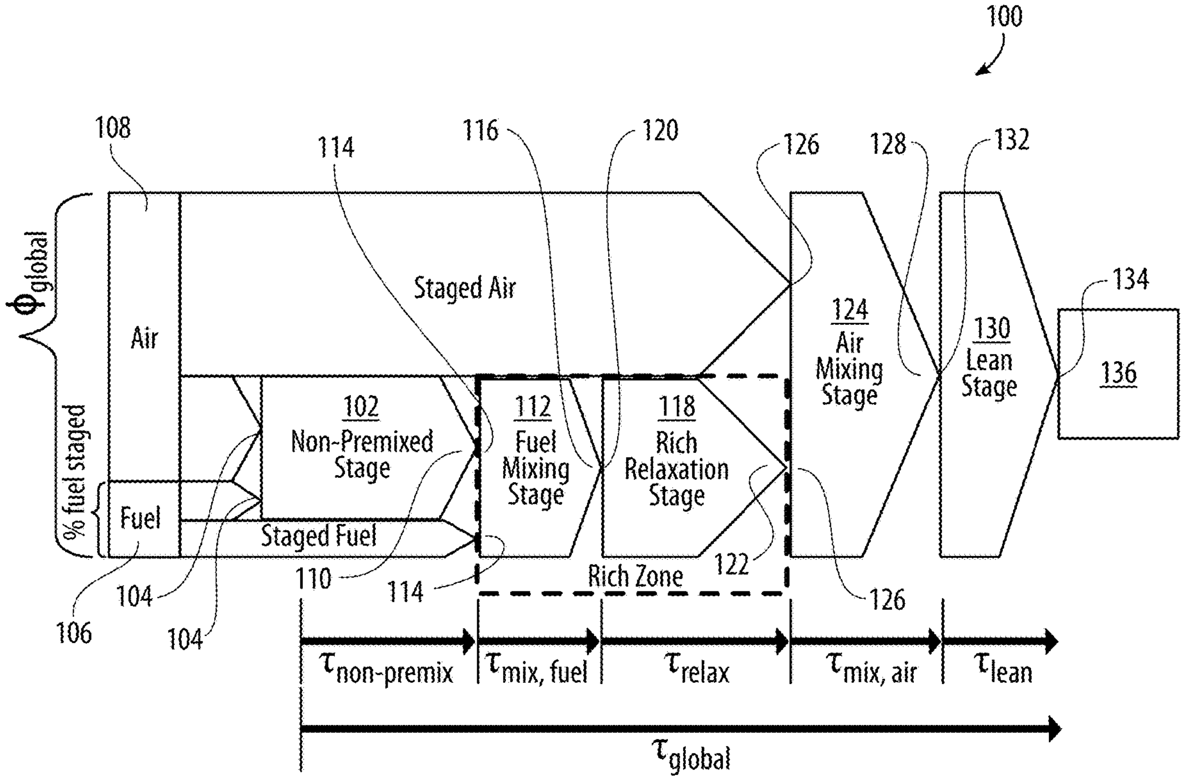
FIG. 4 is a schematic view of an exemplary embodiment of a combustor system constructed in accordance with the present disclosure, showing combustor zones and flow splits with time scales.
Figure 5:
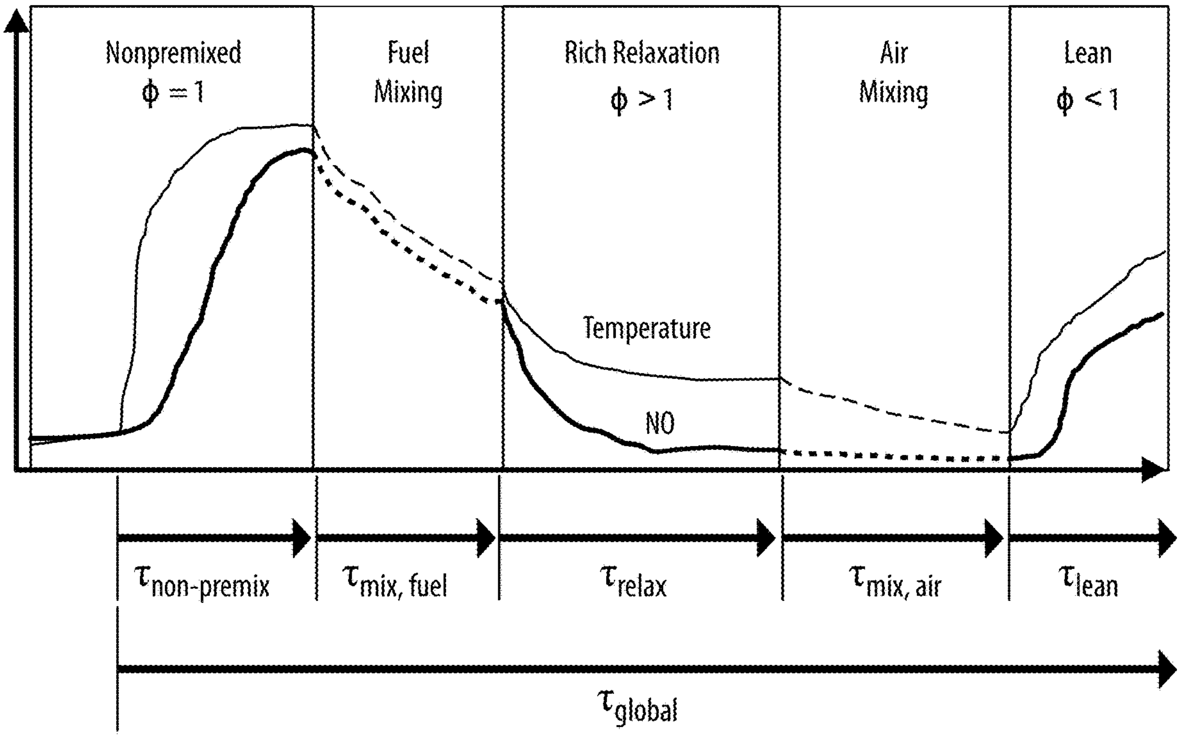
FIG. 5 is a graph showing a notional sketch of temperature and NO through the combustor system of FIG. 4.

To answer these key questions, a network of reactors was constructed and linked as shown in FIG. 4. The mass of each reactor and mixing stream is denoted by its height in the diagram while the horizontal width represents some notion of residence time or distance through the combustor. FIG. 5 shows a cartoon representation of what the temperature and NO trace might look like though this system.

We do not consider the mixing processes of the nonpremixed stage and fuel, or the rich stage products with air; i.e., $\tau_{mix}$, fuel=$\tau_{mix}$, air=0. Of course, we recognize that these time scales can be important to actual system performance, but our focus here is on limiting behaviors of this concept. In other words, the disclosure below does not model a specific implementation of this combustor, but to rather determines limiting kinetic processes and emission levels.

A global equivalence ratio, $\Phi_{global}$, parameterizes the total amounts of air and fuel for a given operating condition. Some percent of the fuel is staged for later injection, the remainder is modeled as a stoichiometric 1D flame in Cantera. The mixture's residence time in the flame is not considered and therefore set $\tau_{non\text{-}premix}$=0. After this flame, the stoichiometric equilibrium products can be adiabatically mixed with the staged fuel. The dilution can cause both a drop in temperature and concentration of intermediate and product species. This new mixture can be tracked as a homogenous batch reactor through the relaxation stage, for a specified amount of time, $\tau_{relax}$. The effective equivalence ratio of this zone can be fully parameterized by the global equivalence ratio and the percentage of the total fuel mass that was staged as shown in equation 1.

$$\phi_{rich} = 1/\left(1 - \frac{\text{staged fuel}}{\text{total fuel}}\right) \qquad \text{Equation 1}$$

The section below (Relaxation Timescales) focuses on the chemistry in this relaxation zone. The metrics of interest are the timescales of NO destruction in this zone as well as, as we will discuss later, HCN destruction.

Next, these rich products can be mixed with the staged air and diluted to $\Phi_{global}$. After this dilution, the mixture resides and burns out in the lean zone for a set time, $t_{lean}$. The effect of air addition on system performance is discussed below (Fundamental NO Minimums).

Relaxation Timescales

Before attempting to study the entire NRRL system, it can be helpful to develop an understanding of the governing chemistry behind key relaxation processes in the rich stage.

NO Relaxation

While equilibrium levels of NO at the end of the rich stage can be quite low, the elevated NO produced in the initial nonpremixed combustion can have time to relax to this equilibrium level. We quantify these rates in this section and show that there can be operating conditions where the NO concentrations essentially "freeze" at elevated levels. Avoiding these conditions can be, therefore, critical to realizing the goals of this rich relaxation concept. It is expected that the NO decay is sensitive to temperature and composition at the start of the relaxation zone. This temperature and composition here can be fundamentally linked and for a stoichiometric burner, can be fully parameterized in terms of the amount of fuel staged (i.e. effective rich equivalence ratio, see Equation 1 and the type of fuel staged.

Figure 6:
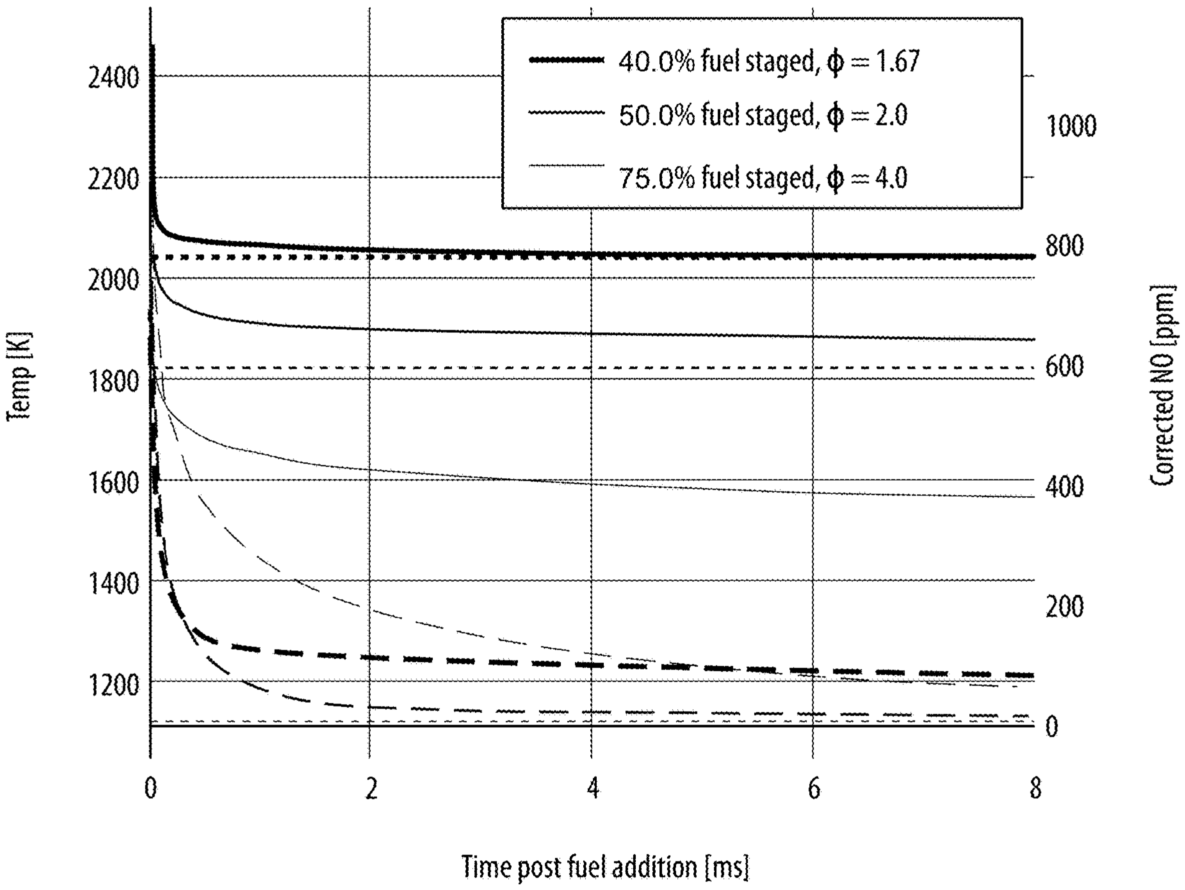
FIG. 6 is a graph showing time histories of temperature (solid) and corrected NO (dashed) for $CH_4$/air at various levels of fuel staging, wherein equilibrium temperature us shown as a dotted line ($T_{inlet}$=650 K, $T_{exit}$=1600 K, P=10 atm)

Representative time histories of temperature and corrected NO concentration (dried and diluted to 15% $O_2$) from $CH_4$/air combustion are shown in FIG. 6 as solid and dashed lines respectively for $T_{inlet}$=650 K, $T_{exit}$=1600 K, P=10 atm. The composition and residence time of the stoichiometric burner can be held constant for these fuel staging levels. Only after $\tau_{non\text{-}premix}$ elapses and the staged fuel is mixed in, does the influence of fuel staging become apparent. The steep drop in both traces is initially due to the instantaneous, adiabatic mixing of various amounts of fuel, shown by the different lines. Increasing the fuel staging cab lead to a larger initial drop in temperature. The post-mixing temperature can be still higher than the new equilibrium temperature and the temperature slowly drops to its equilibrium value via endothermic fuel pyrolysis and the reduction of $CO_2$ into CO. These equilibrium temperatures are shown by dotted line. At sufficiently high fuel staging levels, the initial temperature drop due to dilution can be so great that the temperature and NO relaxation reactions slow down to a point where they are essentially frozen over practical combustor timescales. In FIG. 6, this freezing effect manifests as a non-monotonic relationship between temperature and fuel staging levels and NO relaxation-moving from thickest to thinnest lines leads to lower temperatures but not always lower NO concentrations. Though FIG. 6 appears to show an asymptotic NO decay for each dashed curve, they are still orders of magnitude above equilibrium NO values—indicating frozen chemistry. These values are <O 1) ppm.

Figure 7:
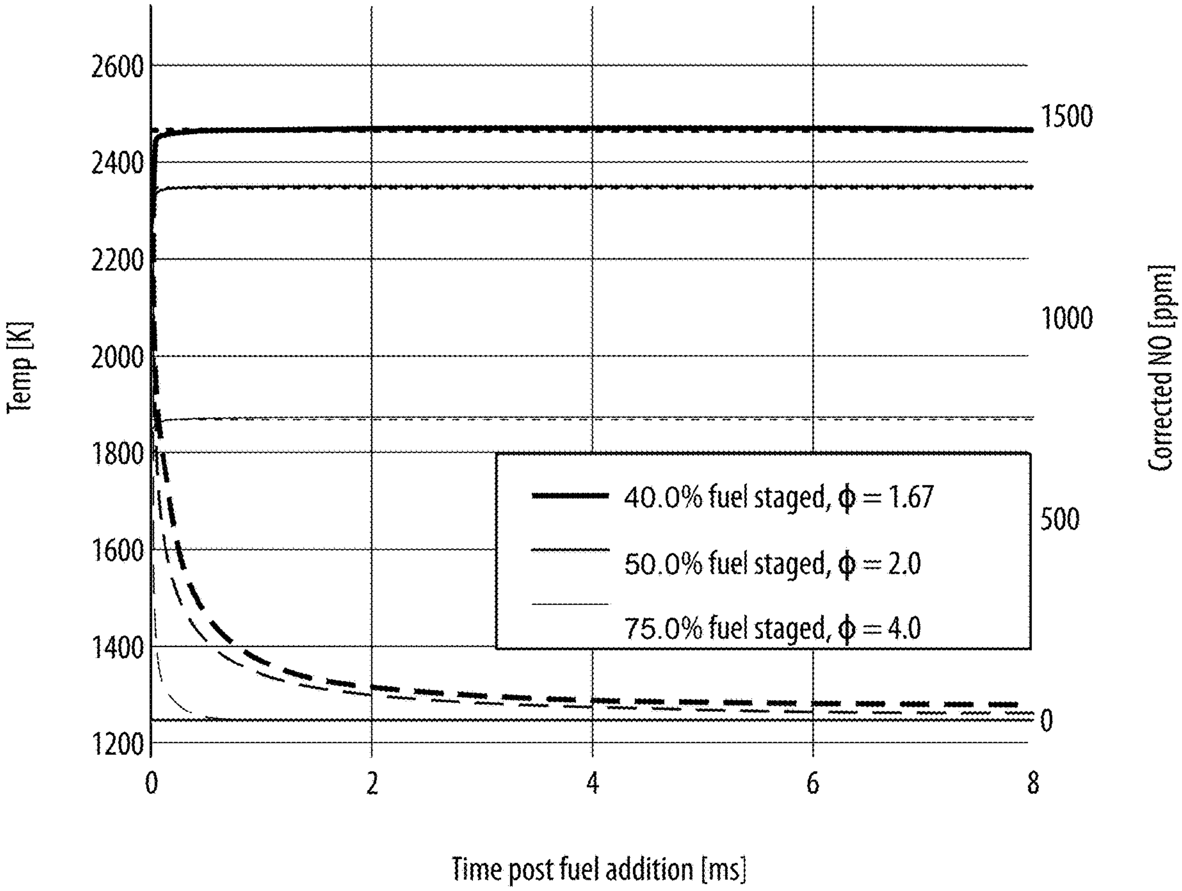
FIG. 7 is a graph showing time histories of temperature and corrected NO (ppm) for $H_2$/air at various levels of fuel staging lines ($T_{inlet}$=650 K, $T_{exit}$=1600 K, P=10 atm)

Similar results can be shown for various blends of hydrocarbons with hydrogen. For cases with pure $H_2$, both the lack of significant endothermic reactions in the NO relaxation zone and the high specific heat of $H_2$ lead to a drop in temperature due to dilution but subsequently, a very rapid temperature rise as the mixture approaches equilibrium, as shown in FIG. 7. Also shown is the NO trace, which rapidly, O(1) ms, achieves equilibrium. This is much faster than the pure $CH_4$ cases in FIG. 6 which takes at least 0(10) ms to reach equilibrium values. Given that $H_2$ blends have shorter chemical timescales than pure $CH_4$ at fixed inlet conditions and target adiabatic flame temperature, much of the subsequent analysis will focus on pure $CH_4$ as it can require the longest relaxation timescales.

To quantify this relaxation time, we define the following $\tau_{NO,decay}$. This decay timescale is distinct and unrelated to $\tau_{relax}$, which is a residence time. Frozen and equilibrium NO concentrations will correspond to $\tau_{NO,decay}/\tau_{relax}$>> and <<1, respectively.

$$\tau_{NO,decay} = \frac{[NO]-[NO]_{eq}}{\frac{d[NO]}{dt}} \quad \text{Equation 2}$$

Figure 8:
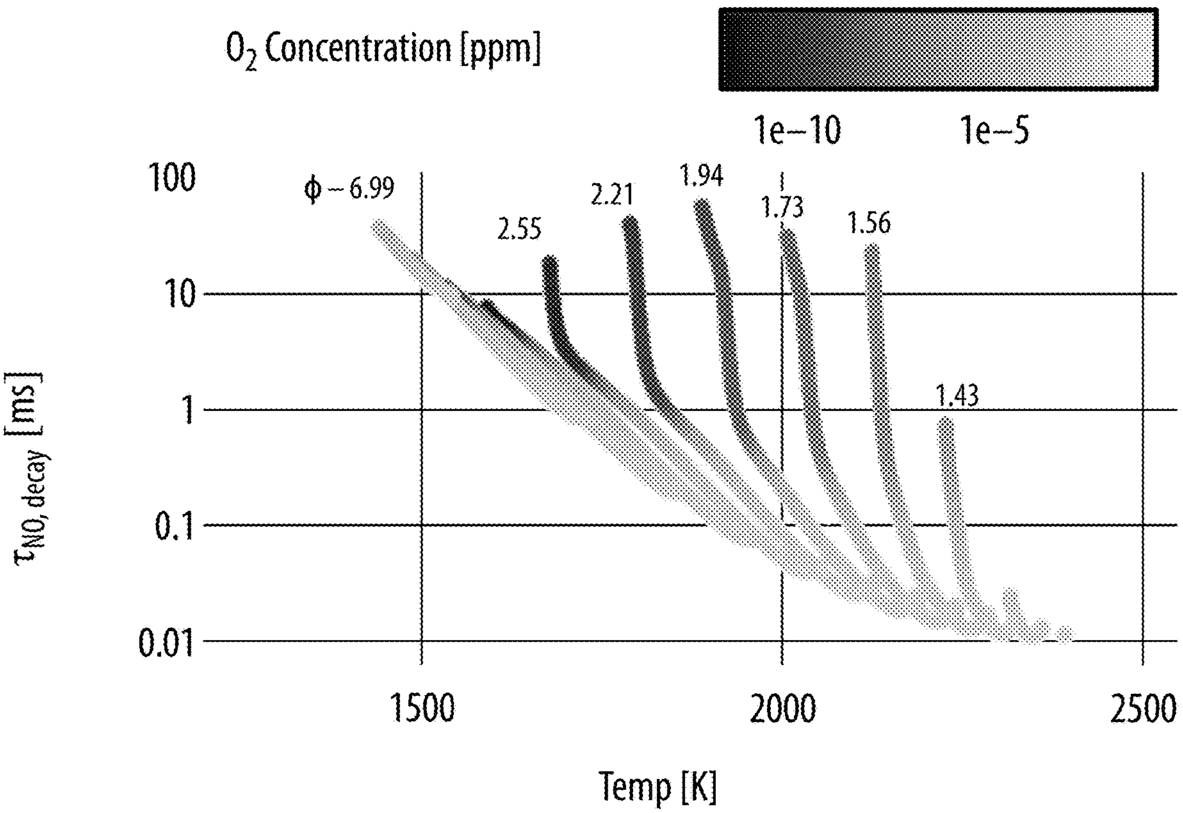
FIG. 8 is a graph showing no decay time scales for $CH_4$/air versus temperature for various fuel staging levels, shaded by $O_2$ concentration and accompanied by φ value ($T_{inlet}$=650 K, $T_{exit}$=1600 K, P=10 atm)

Using Equation 2, this timescale was calculated at each time instant for a many fuel staging curves and fuel blends. These were then filtered to retain points in time where the NO concentration was dropping, eliminating time points where NO was forming. FIG. 8 plots $\tau_{NO,decay}$ vs temperature for $CH_4$. Here each line represents one of the fuel staging levels from FIG. 6. However, unlike FIG. 6, instead of time, the abscissa is temperature, and moving from high to low temperature is a proxy for increasing time as this data is for pure $CH_4$, where the temperature was dropping towards equilibrium.

Note that $\tau_{NO,\ decay}$ is not constant, because the temperature and composition is varying in time. If this decay time scale were only a function of temperature, then all the cases, regardless of fuel staging would lie on a single-valued curve. While many of these trajectories do appear to follow a band, there are notable exceptions for the lines with stoichiometries between 1.43 and 2.55. The decay rates climb by orders of magnitude at nearly constant temperature. This indicates that the decay time scale is a function of more than just temperature. We empirically explored other quantities to condition $\tau_{NO,\ decay}$ on and found that $O_2$ or O concentrations could capture much of this variability. This can be partially seen in FIG. 8, where the level of shading of each point is proportional to the instantaneous $O_2$ concentration. Lightest shading and darkest shading values, respectively, correspond to high and low $O_2$ concentrations. The results look nearly identical if shaded by O concentration.

Figure 9:
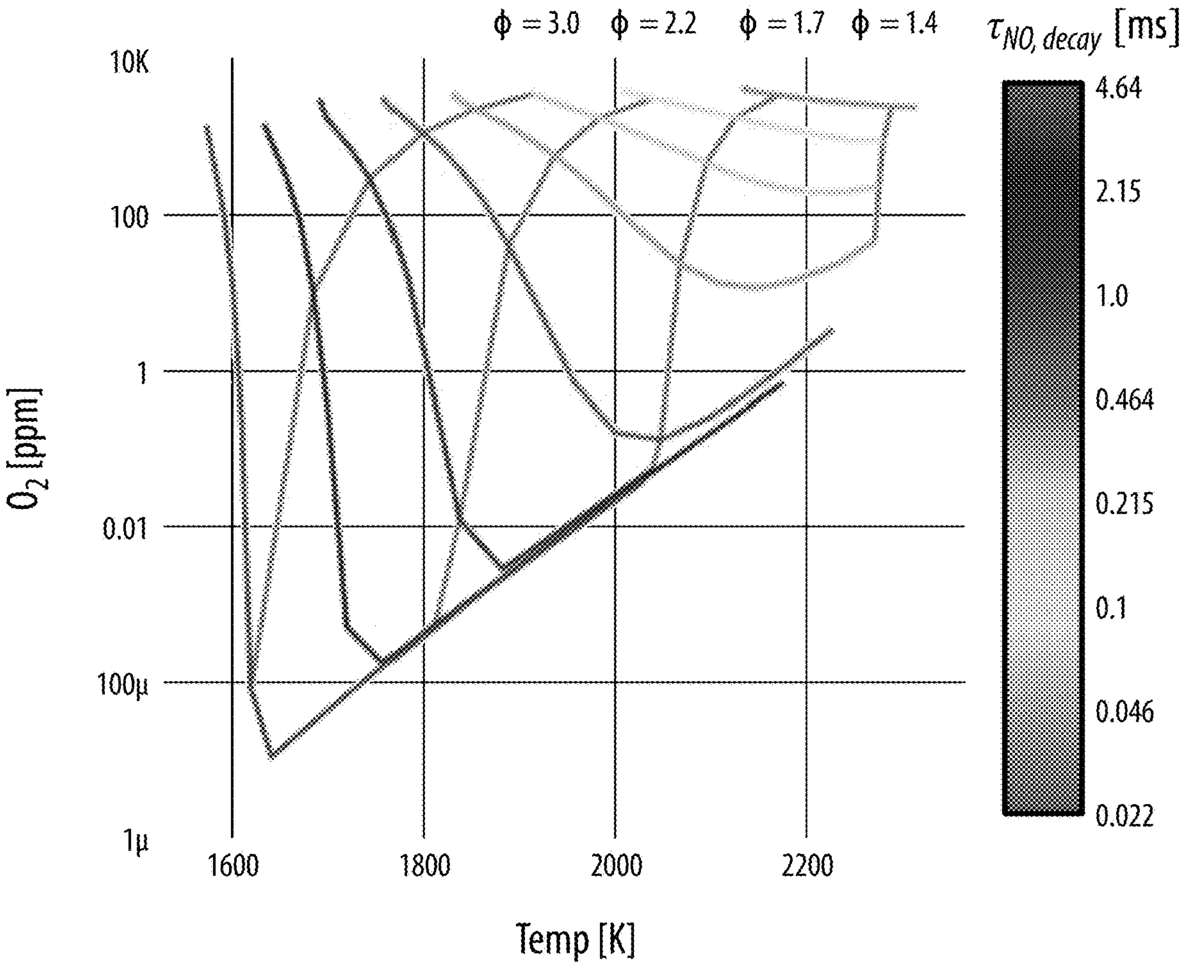
FIG. 9 is a graph showing contours of constant decay time scales in the relaxation zone at various φ values through temperature and $O_2$ concentration ($T_{inlet}$=650 K, $T_{exit}$=1600 K, P=10 atm)

To better see this additional dependence on $O_2$ concentration, the same data from FIG. 8 can be sliced along lines of constant $\tau$ (colored lines) and constant $\Phi_{rich}$ (gray lines) as shown in FIG. 9. The time history of a single reactor is now represented as a gray line, starting in the top right and moving towards the bottom left. For a given reactor, as the NO decays, the decay rate either slows down due to some combination of decreasing $O_2$ concentration and/or decreasing temperature. FIG. 9 shows that below ~1700K, there are nearly vertical lines of constant $\tau$. There, the decay rate is independent of $O_2$ concentration, indicating frozen chemistry. Lines of constant frich<1.7 are the only ones that don't end up with the slower, purple, NO decay timescales. This result can be a guideline for the practical implementation of this concept—only enough fuel needs to be staged to keep the NO decay zone above a certain threshold temperature and $O_2$ concentration. Though cooling air in this zone is not modeled, real combustors can be designed to tolerate mean gas temperatures at or above this threshold.

Figure 10:
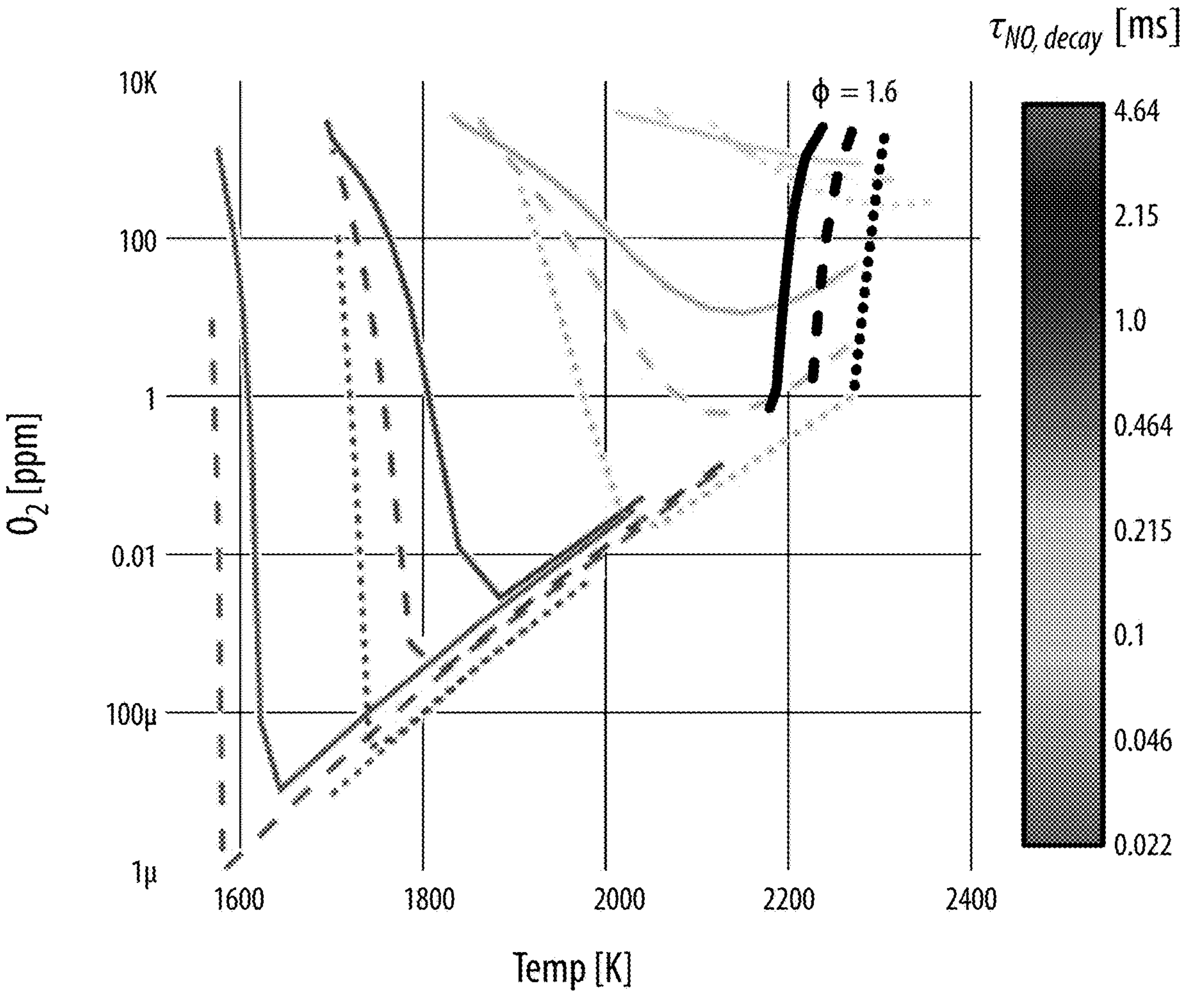
FIG. 10 is a graph showing contours of constant decay time scales in the relaxation zone at various φ values, through temperature and $O_2$ concentration for different $H_2$ blends (solid 0%, dashed 50%, dotted 75%) ($T_{inlet}$=650 K, $T_{exit}$=1600 K, P=10 atm)

Adding $H_2$ increases relaxation rates in all cases. The same analysis is repeated for 50%, and 75% $H_2$ blending levels (by volume) and the results are shown as different lines in FIG. 10. Here, only lines of constant frich=1.6 are shown in gray. Increasing $H_2$ percentage at a fixed fuel staging level moves a reactor towards the right, into regions of higher temperature and therefore lowering the propensity for chemistry to freeze.

The key point is also shown in FIG. 7: relaxation timescales for $H_2$ are orders of magnitude faster than $CH_4$, so relatively slow $CH_4$ relaxation will be used as a limiting case.

This analysis of the relaxation zone leads to constraints on the effective rich equivalence ratio and pushes a low-NO system to long relaxation times. However, it is shown that over practical timescales, this relaxation zone, especially for pure $CH_4$ cases, ends with some level of unrelaxed NO and other radicals. The effect of these radicals on the further relaxation or production of NO in the lean stage will be explored in the subsequent section.

Formation and Relaxation of NO Precursors

As alluded to previously, additional relaxation processes can be critical to the acceptable performance of the lean stage. Unrelaxed radicals, namely HCN and NNH, can be key precursors for the prompt and NNH NO formation mechanisms, respectively. If they have appreciable levels at the start of the air mixing stage, their presence can lead to fast NO formation rates in the lean stage.

Figure 11:
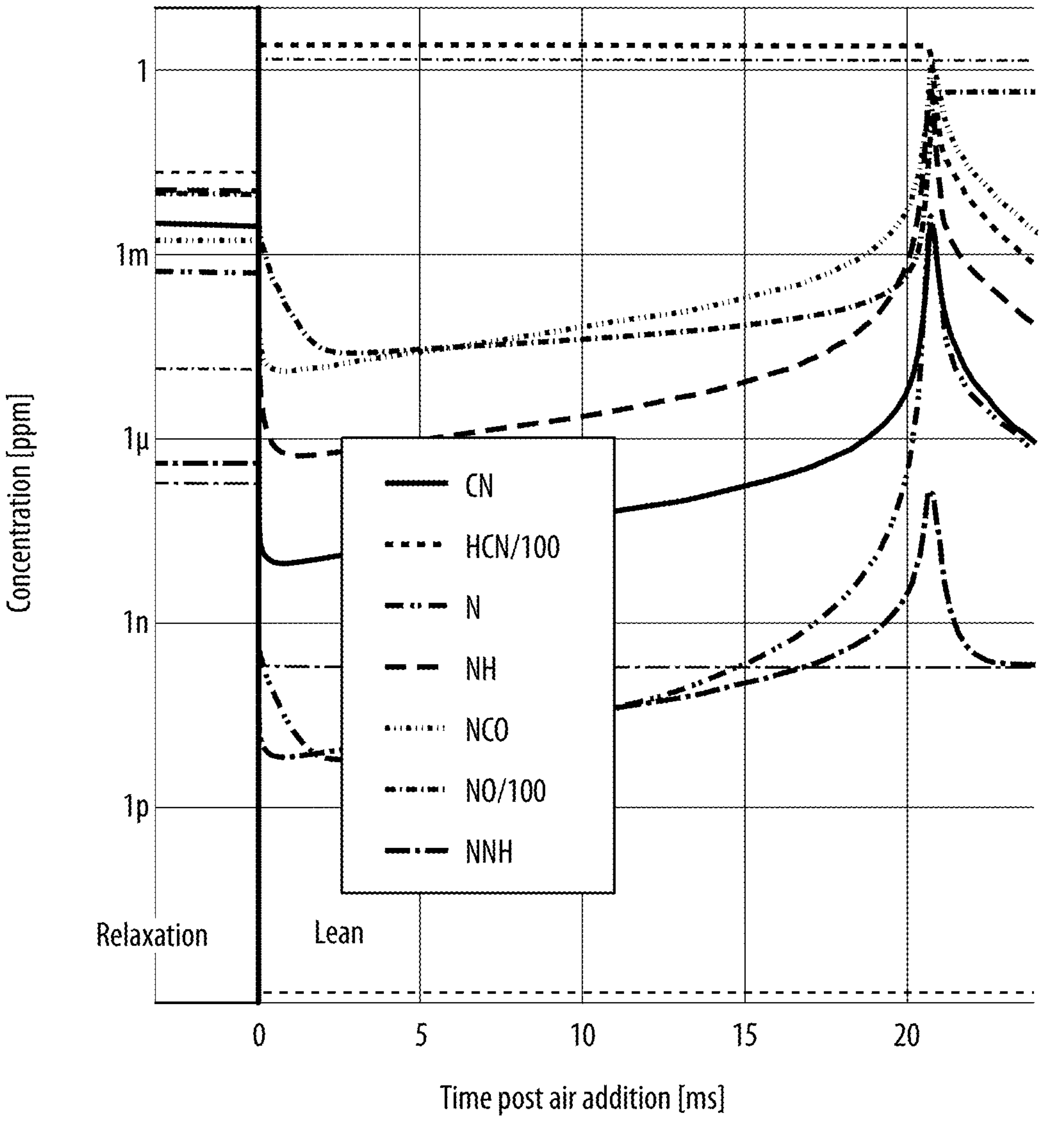
FIG. 11 is a graph showing time histories (solid) of intermediates in NNH and prompt NO mechanisms at $\varphi_{rich}$=2.2, with selected equilibrium values (dashed) ($T_{inlet}$=650 K, $T_{exit}$=1600 K, 10 atm)

The prompt NO route starts with the pyrolysis of hydrocarbon fuels, in a low-oxygen environment, into HCN which can react with O, H, and OH radicals to form CN and NCO. FIG. 11 shows an example calculation where the HCN mole fraction at the end of the relaxation zone is thousands of times higher than the equilibrium value shown by the dashed line. As a result, in the lean zone, the CN and NCO concentrations begin to rise, followed by NH and N which are key precursors for NO formation. This matches the reaction diagram for the prompt NO mechanism as shown in the literature. The concentration of NNH is about 3× higher than its equilibrium value and also reacts to form NO upon air addition. Though the NNH route is responsible for some NO production, the total amount of NNH, and therefore NO produced because of it, is negligible compared to the HCN concentration.

This issue can be unique to the stoichiometric, nonpremixed front end of this combustor concept. In contrast, a rich, premixed flame can mitigate these high levels of HCN by pyrolyzing the fuel in the preheat zone of the premixed flame, which still has high $O_2$ concentrations. In contrast, embodiments of the systems disclosed herein can pyrolyze fuel after the stoichiometric diffusion flame where $O_2$ concentrations can be low, allowing for the HCN pyrolysis product.

Figure 12:
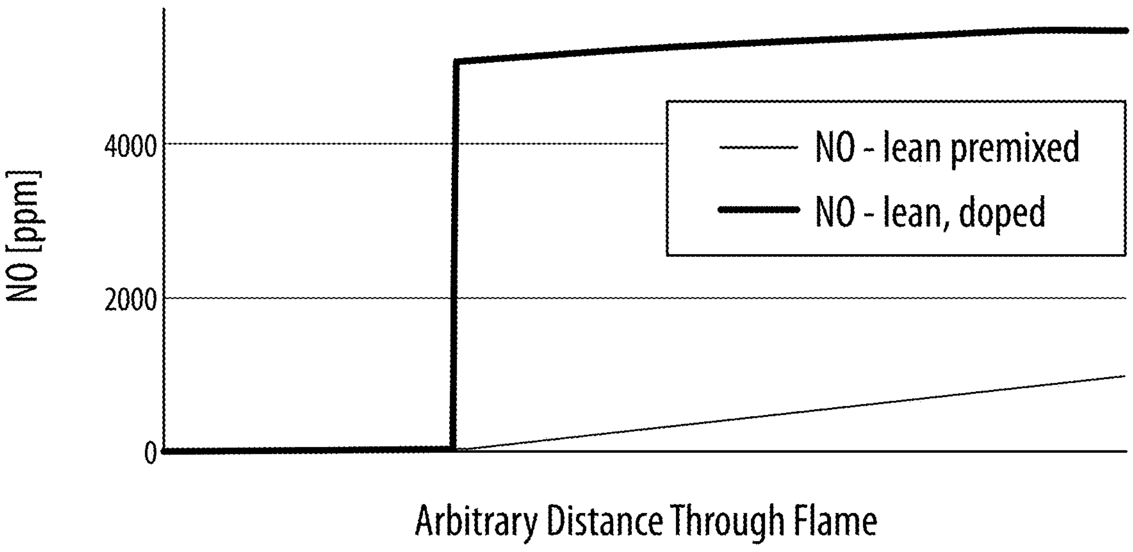
FIG. 12 is a graph showing NO produced from lean premixed mixtures of $CH_4$/air, with and without HCN doping (1% by mole) at 650 K, 10 atm and φ=0.7.

To illustrate why this HCN relaxation process can be so important for the proposed concept, consider an example of lean, premixed reactants with and without some initial levels of HCN. A representative example is shown in FIG. 12, which plots the NO formation time histories for two mixtures at the same equivalence ratio, 4=0.7, but one is doped with 1% HCN (by mole). Note that a massive spike in NO was produced in the flame for the HCN-doped case. This is due to the important role of HCN in prompt NO formation.

Figure 13:
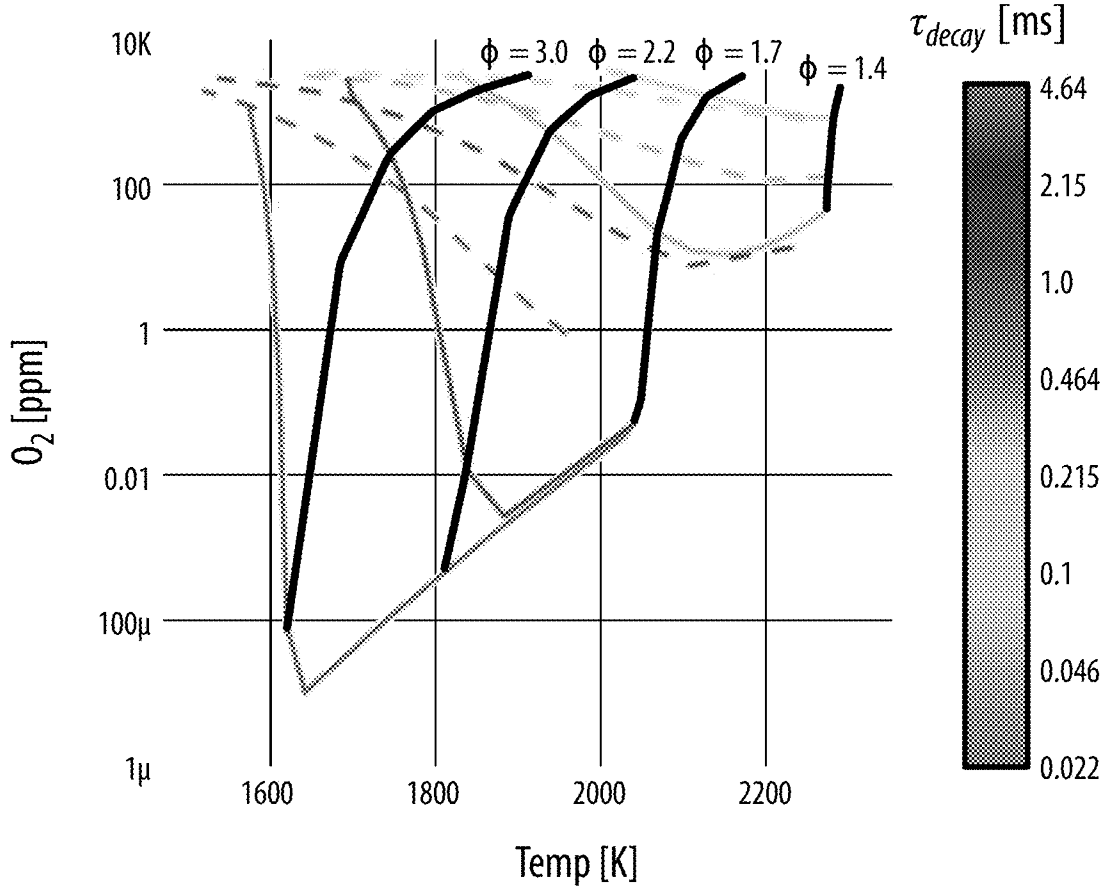
FIG. 13 is a graph showing HCN (dashed) and NO (solid) decay timescales for pure $CH_4$ at 1600 K ($T_{inlet}$=650 K, $T_{exit}$=1600 K, P=10 atm)

Therefore, it is desirable for HCN concentrations to decay sufficiently fast in the relaxation zone to mitigate the prompt NO mechanism in the lean zone. Replacing NO for HCN in Equation 2 leads to an HCN decay time scale and it is plotted in FIG. 13 using the same approach that led to FIG. 9. Here it can be seen that HCN (dashed) lines are consistently at higher temperatures and oxygen concentrations than their correspondingly colored NO counterparts (solid lines). Alternatively, following a single reactor (gray line) shows that at a given point in time, HCN decay is slower than NO decay. This indicates that HCN freezes at higher temperatures and $O_2$ concentrations and therefore is a more limiting constraint on how much fuel can be staged than NO decay is.

Fundamental NO Minimums

This section considers a more system-level question of the minimum NO emissions obtained in some embodiments of the present disclosure.

The solution to this optimization problem can depend crucially on how it is constrained. We assume an initial set of reactants, a final combustor exit temperature, and an overall residence time. We also require that a combustion efficiency of 99.998% must be achieved, a constraint that essentially sets the minimum residence time of the lean stage as will be discussed later. The key quantities that are calculated as part of the optimization process are the fraction of fuel to be burned in the rich and lean stages and the residence time split between the relaxation and lean stages.

Exit NO Sensitivity to Residence Times

Figure 14:
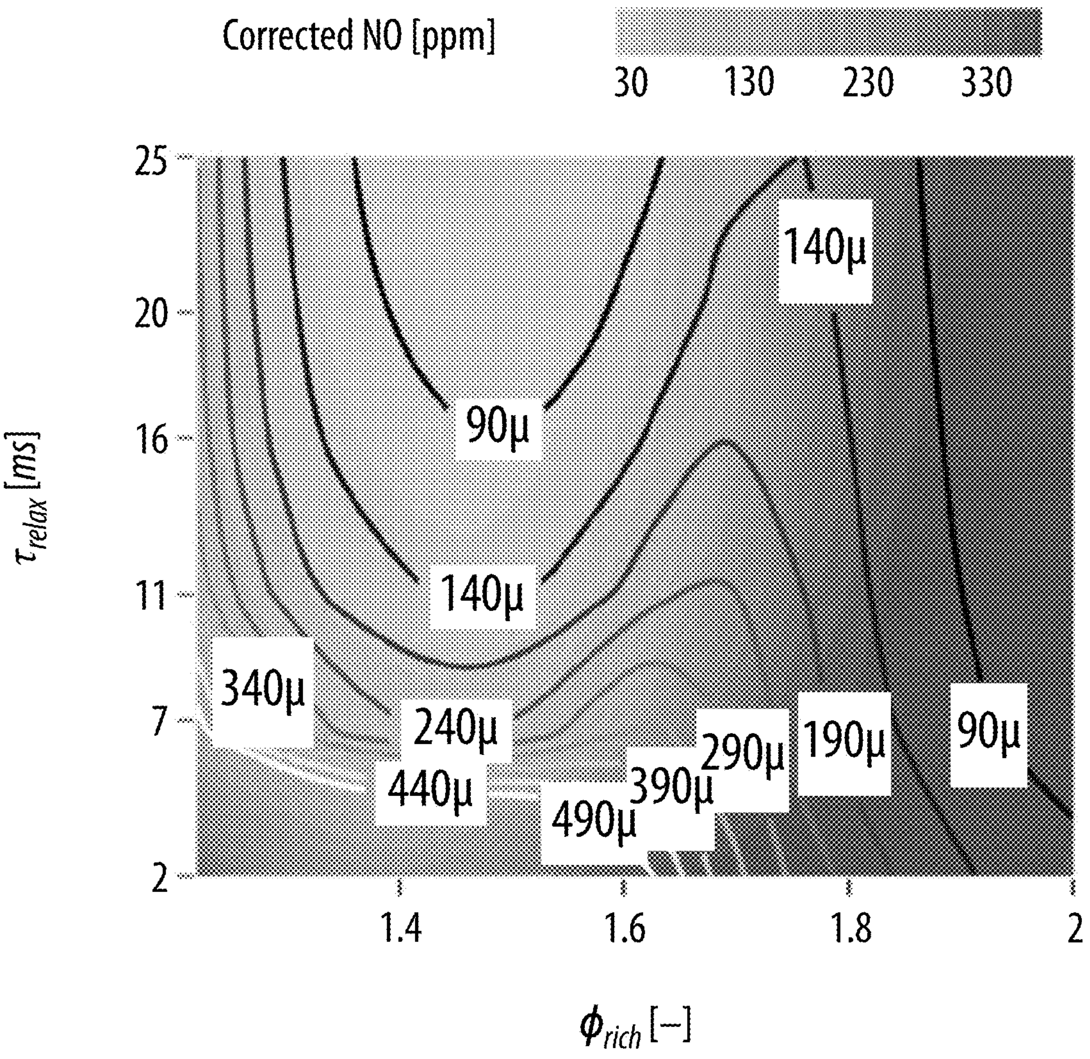
FIG. 14 is a graph showing effects of fuel staging and relaxation time on exit NO (contour field) and unrelaxed NO (contour lines) ($T_{inlet}$=650 K, $T_{exit}$=1600 K, P=10 atm)

To provide intuition, the color gradient in FIG. 14 first plots exit NO concentrations from calculations where we specify $\Phi_{rich}$ and $\tau_{relax}$ for $T_{inlet}$=650 K, $T_{exit}$=1600 K, and P=10 atm. $\tau_{lean}$ ends up being the shortest time possible that meets the combustion efficiency constraint. The first evident trend is that there is a monotonic reduction in exit NO with increasing $\tau_{relax}$. This appears a natural conclusion from the proceeding section; at a fixed equivalence ratio, longer relaxation timescales lead to lower unrelaxed NO and HCN and therefore lower overall lean NO concentrations. As a result of the HCN constraint, the $\Phi_{rich}$ that leads to the lowest amount of unrelaxed NO is not that which produces the lowest NO at the combustor exit. For example, comparing FIG. 6 and FIG. 14 shows that for a given $\tau_{relax}$, $\Phi_{rich}$=1.42 (30% fuel staged) produces more unrelaxed NO (20 ppm) yet less exit NO (17 ppm) than $\Phi_{rich}$=2.0 (50% fuel staged) (10 ppm unrelaxed, 500 ppm exit). This can also be seen in FIG. 14 where the black contours show where unrelaxed NO is minimized. The exit NO minimization occurs at leaner equivalence ratios than the unrelaxed one due to the unrelaxed HCN that persists at higher equivalence ratios. This shows the same non-monotonicity in unrelaxed NO with respect to $\Phi_{rich}$ from FIG. 6.

Figure 15:
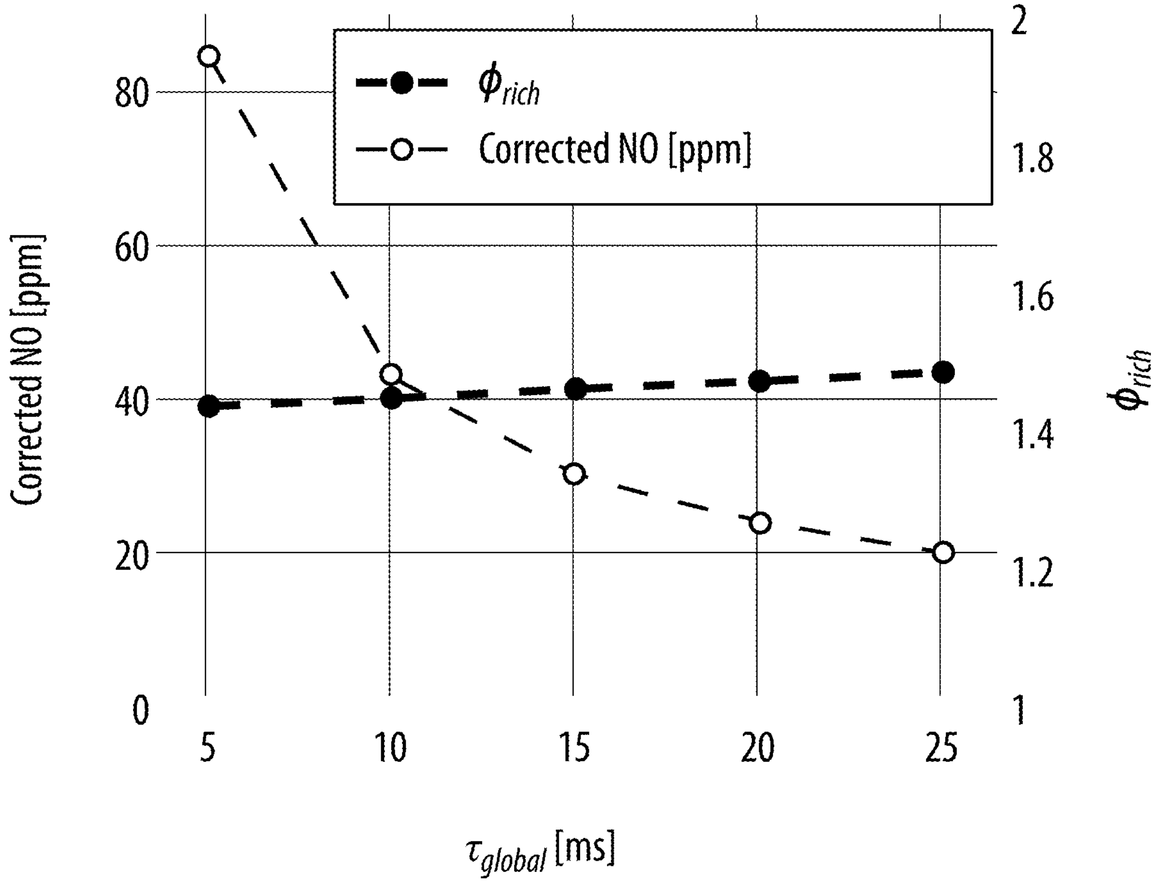
FIG. 15 is a graph showing minimum achievable NO for $CH_4$/air at various global residence times, with the corresponding $\varphi_{rich}$ ($T_{inlet}$=650 K, $T_{exit}$=2100 K, P=10 atm)

Further analysis of the conditions that minimize NO, and resultant NO values, are shown in FIG. 15. Here, the pressure is fixed to 10 atm, with an inlet temperature of 650 K and exit temperature of 2100 K. This exit temperature is higher than in the previous plots because it is expected that Zeldovich NO formation will become increasingly significant in the lean zone at higher temperatures with longer residence times. FIG. 15 shows that the optimal $\Phi_{rich}$ is only slightly sensitive to the $\tau_{global}$. The optimal $\tau_{lean}$ is not shown, but is very low, about 160 µs, regardless of $\tau_{global}$. Therefore, the exit NO monotonically dropping with increasing $\tau_{global}$ is effectively the same as it dropping with increasing $\tau_{relax}$. The insensitivity of $\tau_{lean}$ to $\tau_{global}$ is due to the time required to burn out the remaining CO. The speed of this CO burnout, and therefore the length of the lean zone, is highly dependent on temperature and composition in the lean zone. Given that the optimal $\Phi_{rich}$ doesn't significantly change and $\tau_{relax}$ is long enough for the temperature to have mostly approached equilibrium values, the composition and temperature at the end of the relaxation zone can be also effectively the same regardless of $\tau_{global}$.

These optimizations show that minimizing NO production from an NRRL combustor, at fixed operating conditions, can push designs to a particular $\Phi_{rich}$ and as long of a $\tau_{relax}$ or $\tau_{global}$ as practically possible, with the shortest possible $\tau_{lean}$.

Exit NO Sensitivity to Combustor Conditions

This section explores the performance of an embodiment of an NRRL concept at various operating conditions, i.e. inlet/exit temperatures and pressures for a fixed $\tau_{relax}$=25 ms. The nominal conditions are 10 atm, with an inlet temperature of 650K and exit temperature of 2100K. Sweeping one of these parameters, and keeping the other two fixed lead to an optimal $\Phi_{lean}$ and $\Phi_{rich}$ to minimize exit NO.

The optimal $\tau_{lean}$ is not shown across these sweeps but can be orders of magnitude smaller than $\tau_{relax}$ and therefore $\tau_{relax}$ can be a proxy measure of $\tau_{global}$. The optimal $\tau_{lean}$ can be consistently O(1) ms for low pressures and exit temperatures and O(0.1) ms for higher pressures, exit temperatures, and the whole range of inlet temperatures. This can be because these lower exit temperatures and pressures lead to slower reaction rates in the lean zone.

The optimum $\Phi_{rich}$ is also not shown but can be only slightly sensitive to combustor pressure and inlet and exit temperatures. The optimal $\Phi_{rich}$ can span a range from 1.56-1.45 as combustor pressure increases from 1 to 15 atm, for a fixed inlet and exit temperature, 650 K and 2100 K, respectively. $\Phi_{rich}$ can span 1.33-1.60 as inlet air temperature increases from 350 to 850 K for pressure fixed to 10 atm and outlet temperature fixed to 2100 K. The optimal $\Phi_{rich}$=1.47 can be insensitive to the combustor exit temperature for pressure fixed to 10 atm and inlet temperature fixed to 650 K.

Figure 16:
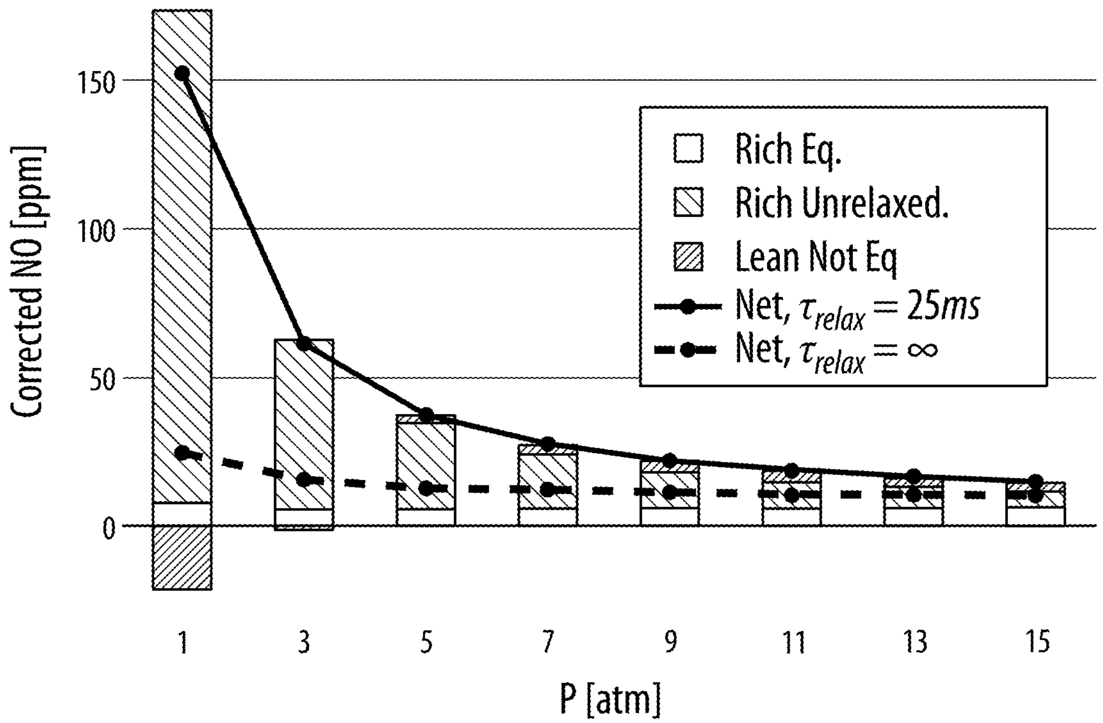
FIG. 16 is a graph showing dependence of net NO emissions as a function of pressure (bars also show relative contributions of different NO sources) ($T_{inlet}$=650 K, $T_{exit}$=2100 K, $\tau_{relax}$=25 ms)
Figure 17:
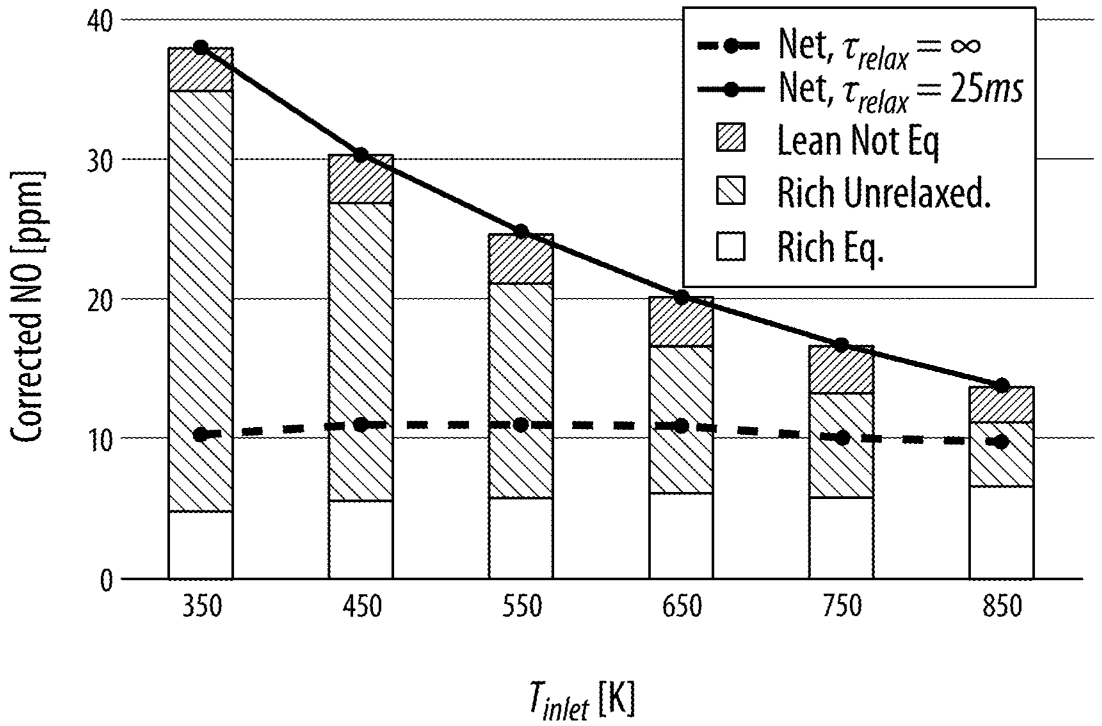
FIG. 17 is a graph showing dependence of net NO emissions as a function of inlet temperature (bars also show relative contributions of different NO sources ($T_{exit}$=2100 K, P=10 atm, $\tau_{relax}$=25 ms)
Figure 18:
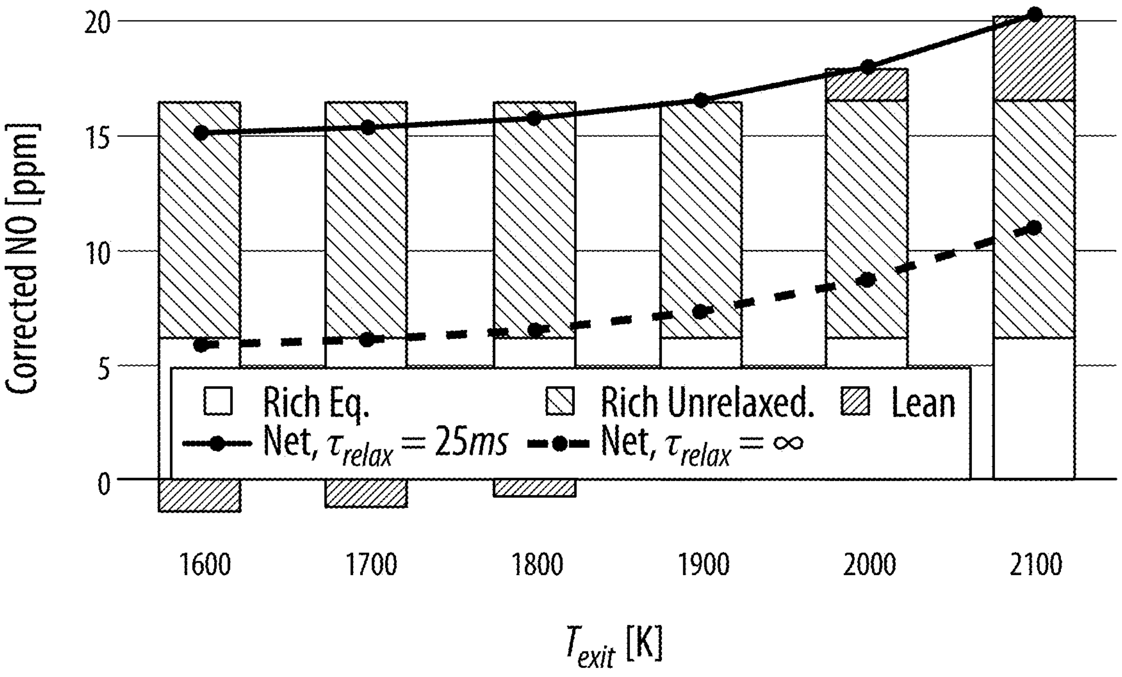
FIG. 18 is a graph showing dependence of net NO emissions as a function of exit temperature (bars also show relative contributions of different NO sources ($T_{inlet}$=650 K, P=10 atm, $\tau_{relax}$=25 ms)

Using the corresponding optimal $\tau_{lean}$ and $\Phi_{rich}$ for each pressure, inlet and outlet temperature, FIGS. 16, 17, and 18 also compare NO production associated with its rich equilibrium ( ), the amount of additional unrelaxed NO ( ) that exists due to finite relaxation timescales, and freezing chemistry, and then the amount of NO produced or destroyed in the lean zone due to the addition of quench air ( ). Each of these bars represent a contribution to net exit NO (solid black line). Exit NO is also shown for the limit where NO fully relaxes to equilibrium, which is achieved with sufficient $\tau_{relax}$, a time whose value can be pressure and temperature dependent (noted in figure as limit of infinite relaxation time) (Note: For this limiting case, it's unrelaxed component ( ) would disappear, but strictly speaking, this limiting net NO is not simply the sum of the displayed orange and blue-gray bars. The amount of NO destroyed and produced in the lean zone ( ) differs slightly between the $\tau_{relax}$=25 ms and $\tau_{relax}=\infty$ cases because the composition and temperature at the inlet of the respective lean zones differ). These are all reported on a corrected basis to avoid inflation of the rich contributions relative to the lean or net values due to air dilution.

As operating pressure increases, the net NO produced decreases as shown in FIG. 16. This reduction is entirely due to the reduction of the unrelaxed NO contribution. At higher pressures, the rich stage relaxes faster due to faster reaction rates. At low pressures, there is so much unrelaxed NO from the rich stage that it continues being destroyed at the start of the lean zone. Eventually, if run for long enough lean residence times, this bar would turn positive again due to high lean equilibrium NO levels. At fixed residence time, this exemplary NRRL concept can perform better at higher pressures, which contrasts with LPM systems that produce more NO at higher pressures.

FIG. 17 shows that increasing the inlet temperature leads to less unrelaxed NO at the end of the lean stage. This decrease in unrelaxed NO is due to hotter fuel being added to the relaxation zone, speeding up decay times. This decrease is greater than the increase in rich equilibrium NO and therefore the system produces less NO at higher inlet temperatures than lower ones.

FIG. 18 shows how these contributions change as a function of exit temperature and each stack of bars is again at its optimal $\Phi_{rich}$ and at the same $\tau_{relax}$=25 ms. Therefore, the rich equilibrium and unrelaxed NO components can be identical. The variation in net NO can be entirely due to the lean zone. Lean NO destruction is present at low combustor exit temperatures where the Zeldovich mechanism is slower at forming NO. At higher temperatures, even though the required amount of lean residence time decreases, as expected. This only results in a small increase in corrected NO concentrations, from 15-20 ppm, across a wide range of turbine inlet temperatures, 1600 K to 2100K. This 30% increase from 1600 K to 2100 K is far smaller than the 15× increase in corrected NO that would be produced by an equivalent LPM running to the same combustion efficiency constraint and higher exit temperatures.

Comparison of Lean, Premixed and NRRL Results

Figure 19:
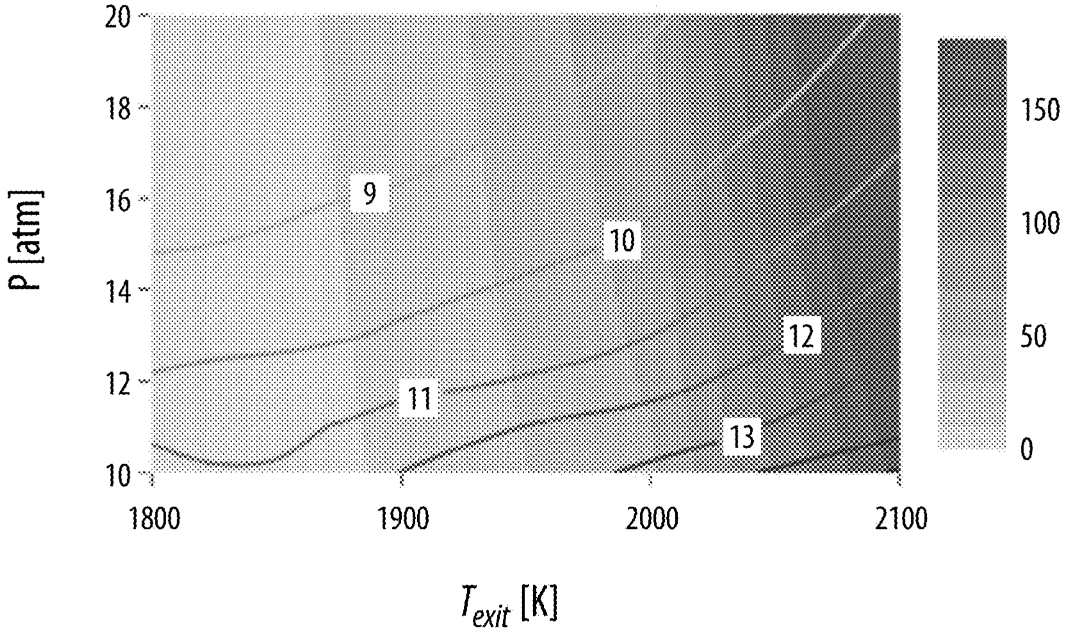
FIG. 19 is a graph showing contours of corrected exit NO (ppm) at fixed $T_{inlet}$=800 K for LPM (contoured field, $\tau_{global}$=15 ms) and NRRL (contour lines, $\tau_{relax}$=25 ms) combustors.

To better compare the pressure and exit temperature sensitivities of LPM systems and NRRL ones, FIG. 19 shows the exit NO for an LPM combustor (filled contour field) and exemplary NRRL one (contour lines) at various pressures and exit temperatures for a fixed inlet temperature of 800 K. The LPM combustor was run for 15 ms, a typical residence time for state-of-the-art systems at full power. The NRRL one was run at a fixed $\tau_{relax}$=25 ms, like in the previous plots. At higher exit temperatures, LPM systems' exit NO increases exponentially while the NRRL one exhibits a much less dramatic increase in NO. The NRRL system's exit NO also decreases with increasing pressure, unlike the LPM combustor's exit NO contours.

Figure 20:
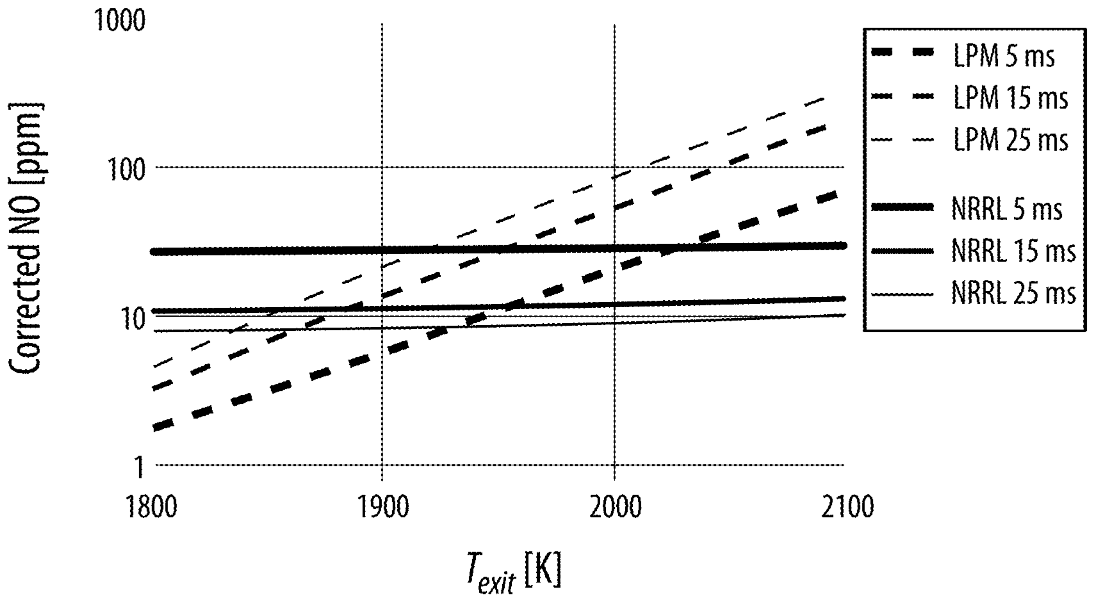
FIG. 20 is a graph comparing exit NO for NRRL and LPM combustors at the same $\tau_{global}$ (P=20 atm and $T_{inlet}$=800 K)
Figure 21:
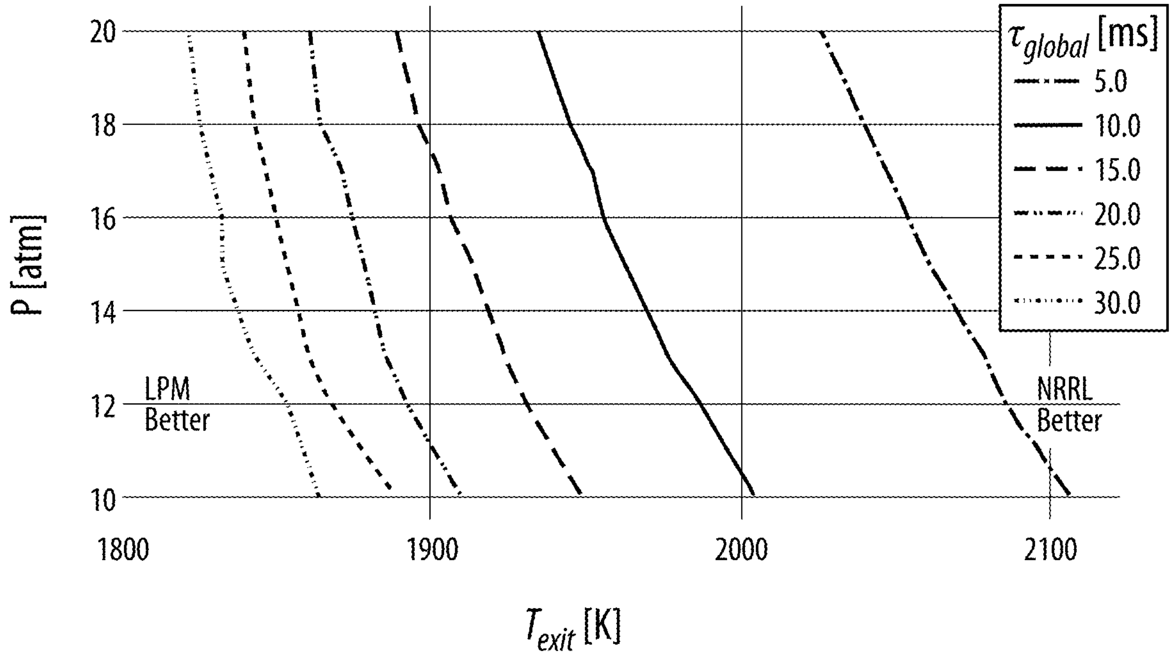
FIG. 21 is a regime map showing iso-lines where LPM and NRRL combustors produce the same NO levels, wherein pressure and temperature combinations to the left/right of an iso-line for a given residence time indicate where LPM/NRRL produce less NO.

As noted above, LPM and NRRL systems have completely different residence time sensitivities. For a given operating condition, there is a $\tau_{global}$ above/below which an NRRL combustor produces less/more NO than an LPM one. FIG. 20 shows this breakeven residence time for various exit temperatures at fixed inlet conditions. FIG. 21 quantifies the crossover point over a range of pressure/exit temperatures for a range of global residence times. Generally speaking, it shows that reducing residence times favors LPM approach, and that NRRL approaches can be increasingly favored at higher pressure and temperature conditions.

With reference again to FIG. 4, an exemplary embodiment of the present disclosure provides a combustor system 100 for performing combustion for gas turbine engines and the like, as disclosed herein. The combustor system 100 includes a non-premixed stage conduit 102 for the non-premixed stage with one or more inlets 104 operatively connected to receive fuel from a source 106 of non-premixed fuel and to receive air from a non-premixed source 108 of air. The source 106 of non-premixed fuel can include, e.g., a fuel system with a storage tank and fuel pump. The source 108 of air can include, e.g., a gas turbine engine compressor. The non-premixed stage conduit 102 has an outlet 110 configured to issue a flow of initial stage products.

A fuel mixing conduit 112 for the fuel mixing stage includes one or more inlets 114 operatively connected to receive the initial stage products from the non-premixed stage conduit 102 and staged fuel from the source 106 of non-premixed fuel. The fuel mixing conduit 112 has an outlet 116 configured to issue a flow of rich front end products. The fuel mixing conduit 112 generates the flow of rich front end products from a mixture of fuel from the non-premixed fuel source 106 and the flow of initial stage products, including non-premixed combustion products and excess fuel, generated from the non-premixed stage conduit 102.

A relaxing conduit 118 for the rich relaxation stage has an inlet 120 operatively connected to receive the flow of rich front end products. The relaxing conduit 118 is configured to provide residence time, e.g. through length of the conduit in combination with the pressure in the conduit, to convert the flow of rich front end products into rich stage products. The relaxing conduit 118 has an outlet 122 configured to issue the rich stage products. The relaxing conduit 118 relaxes NOx formed in the flow of rich front end products into an equilibrium state of the NOx to generate rich stage products.

An air mixing conduit 124 for the air mixing stage has one or more inlets 126 operatively connected to receive the rich stage products and to receive staged air, e.g., from the non-premixed source 108 of air. The air mixing conduit 124 is configured to provide residence time to convert the rich stage products into air-mixed rich products, e.g. through the combination of residence time and pressure in the conduit. The air mixing conduit 124 has an outlet 128 configured to issue a flow of the air-mixed rich products generated in the air mixing conduit 124. The air-mixed rich products can be at a globally fuel-lean composition.

With continued reference to FIG. 4, a lean stage conduit 130 for the lean stage has an inlet 132 operatively connected to receive the flow of the air-mixed rich products. The lean stage conduit 130 can be configured to provide residence time, e.g. through combination of length of the conduit and pressure in the conduit, to oxidize the flow of the air-mixed rich products into oxidized air-mixed products. The lean stage conduit 130 can have an outlet 134 configured to issue the oxidized air-mixed products, e.g. to a downstream component 136 such as a turbine stage of a gas turbine engine. Oxidizing the air-mixed rich products in the lean stage can include increasing temperature of the air mixed products to issue a flow of the oxidized air-mixed products to the downstream component 136 at a temperature higher than that of the air-mixed rich products prior to oxidizing and/or lower than that of the rich products before the air mixing.

One skilled in the art will readily appreciate that a conduit, such as the conduits described above, can include any suitable component with a wall having openings for the inlets/outlets described herein, wherein the wall bounds a flow path for gas from the one or more inlets to one or more outlets. One skilled in the art will also readily appreciate that the wall of a conduit in a combustor system can optionally include apertures for air cooling or the like, while still serving as a containment for the flow path therethrough.

CONCLUSION

As explained above, disclosed herein are novel Non-premixed-Rich-Relaxation-Lean (NRRL) combustor techniques and systems. Some of these concepts can be far more fuel flexible than conventional lean systems due to their nonpremixed front end flame and resulting static flame stability. The performance of these concepts can depend greatly on the behavior of the relaxation zone that occurs after the fuel addition in the rich zone. This zone can serve to relax the stoichiometric products to the ideal rich equilibrium values. Of key importance is the decay of NO and HCN, if these are sufficiently relaxed, only then can low exit NO levels be realized. This decay timescale can be constrained by the composition and temperature in the relaxation zone, which in turn can depend on the amount of fuel staged. This can lead to an optimization problem that tries to minimize exit NO by varying residence times and fuel staging levels. Resulting NO levels and their sensitivity to operating conditions were explored and contrasted with LPM systems. These systems can produce less NO at longer residence times, higher pressures, and higher inlet temperatures. Exit NO also does not increase as much as it would in an equivalently efficient LPM system as both are pushed to higher exit temperatures.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A combustor comprising:

a non-premixed initial stage configured to receive fuel from a non-premixed fuel source and to receive air from a non-premixed air source to produce a flow that comprises non-premixed combustion products and excess fuel;

a fuel mixing stage downstream of the non-premixed initial stage, the fuel mixing stage configured to receive and mix the flow of non-premixed combustion products and excess fuel from the non-premixed initial stage with fuel from the non-premixed fuel source;

a relaxing stage downstream of, and receiving flow from, the fuel mixing stage;

an air mixing stage downstream of, and receiving flow from, the relaxing stage; and a lean stage downstream of, and receiving flow from, the air mixing stage;

wherein the relaxing stage is configured to relax:

NOx formed in the non-premixed initial stage to its equilibrium state; or

HCN formed in the non-premixed initial stage to its equilibrium state.

2. The combustor of claim 1, wherein the fuel mixing stage generates a flow of rich front end products.

3. The combustor of claim 2, wherein the relaxing stage comprises a plurality of relaxation zones.

4. The combustor of claim 2, wherein the relaxing stage is operatively connected to receive the flow of rich front end products.

5. The combustor of claim 1, wherein the relaxing stage is further configured to generate rich stage products.

6. The combustor of claim 5, wherein the air mixing stage is configured to mix the rich stage products with staged air to generate air-mixed rich products.

7. The combustor of claim 6, wherein the lean stage is configured to oxidize the air-mixed rich products into oxidized air-mixed products.

8. The combustor of claim 7, wherein the lean stage is further configured to increase a temperature of the oxidized air-mixed products to an exit temperature.

9. A combustor system comprising:

a non-premixed stage conduit with one or more inlets operatively connected to receive fuel from a source of non-premixed fuel and to receive air from a non-premixed source of air, the non-premixed stage conduit having an outlet configured to issue a flow of initial stage products;

a fuel mixing conduit with one or more inlets operatively connected to receive the initial stage products from the non-premixed stage conduit and staged fuel from the source of non-premixed fuel, the fuel mixing conduit having an outlet configured to issue a flow of rich front end products;

a relaxing conduit with an inlet operatively connected to receive the flow of rich front end products, the relaxing conduit being configured to provide residence time to convert the flow of rich front end products into rich stage products, the relaxing conduit having an outlet configured to issue the rich stage products; and an air mixing conduit with one or more inlets operatively connected to receive the rich stage products and to receive staged air, the air mixing conduit being configured to provide residence time to convert the rich stage products into air-mixed rich products, the air mixing conduit having an outlet configured to issue a flow of the air-mixed rich products, wherein the air-mixed rich products are at a globally fuel-lean composition;

wherein the relaxing conduit is further configured to relax:

NOx formed in the non-premixed stage conduit to its equilibrium state; or

HCN formed in the non-premixed stage conduit to its equilibrium state.

10. The combustor system of claim 9 further comprising:

a lean stage conduit with an inlet operatively connected to receive the flow of the air-mixed rich products, wherein the lean stage conduit is configured to provide residence time to oxidize the flow of the air-mixed rich products into oxidized air-mixed products, wherein the lean stage conduit has an outlet configured to issue the oxidized air-mixed products.

11. A method of combustion comprising:

receiving fuel and air, the fuel from a source of non-premixed fuel and the air from a non-premixed source of air, and generating a flow of initial stage products;

mixing the flow of initial stage products with staged fuel from the source of non-premixed fuel, and generating a flow of rich front end products;

providing residence time to the flow of rich front end products, converting the flow of rich front end products into rich stage products; and mixing the rich stage products and staged air, converting the rich stage products into air-mixed rich products that are at a globally fuel-lean composition;

wherein providing the residence time comprises relaxing NOx formed in the flow of rich front end products into an equilibrium state of the NOx to generate the rich stage products.

12. The method of claim 11, wherein the staged fuel is sourced from the source of non-premixed fuel and the initial stage products comprise non-premixed combustion products and excess fuel.

13. The method of claim 11, wherein the staged air is from the non-premixed source of air.

14. The method of claim 13 further comprising oxidizing the air-mixed rich products into oxidized air-mixed products.

15. The method of claim 14, wherein oxidizing the air-mixed rich products includes increasing a temperature of the air-mixed rich products to issue a flow of the oxidized air-mixed products at a temperature higher than that of the air-mixed rich products prior to oxidizing and/or lower than that of the rich stage products before the mixing of the rich stage products and the staged air.

* * * * *